(12) United States Patent
Yasuda

(10) Patent No.: US 10,303,120 B2
(45) Date of Patent: May 28, 2019

(54) DIGITAL HOLOGRAPHIC APPARATUS

(71) Applicant: FUJI XEROX CO., LTD., Tokyo (JP)

(72) Inventor: Shin Yasuda, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 65 days.

(21) Appl. No.: 15/208,371

(22) Filed: Jul. 12, 2016

(65) Prior Publication Data
US 2017/0277123 A1    Sep. 28, 2017

(30) Foreign Application Priority Data

Mar. 28, 2016   (JP) ................. 2016-064332
Mar. 28, 2016   (JP) ................. 2016-064462

(51) Int. Cl.
*G03H 1/04*    (2006.01)
*G03H 1/26*    (2006.01)
*G03H 1/30*    (2006.01)

(52) U.S. Cl.
CPC ............ *G03H 1/0443* (2013.01); *G03H 1/30* (2013.01); *G03H 2001/0445* (2013.01);
(Continued)

(58) Field of Classification Search
CPC ...... G03H 1/2205; G03H 1/0443; G03H 1/30; G03H 2001/0088; G03H 2001/261;
(Continued)

(56) References Cited

U.S. PATENT DOCUMENTS

| 7,027,197 B2* | 4/2006 | Newswanger ..... G02B 27/2271 |
| | | 359/23 |
| 2009/0073522 A1* | 3/2009 | Thomas ............... G03H 1/0443 |
| | | 359/22 |

(Continued)

FOREIGN PATENT DOCUMENTS

JP    2005-037902 A    2/2005
JP    2014-071207 A    4/2014

OTHER PUBLICATIONS

Kim, Myung K., "Principles and techniques of digital holographic microscopy," SPIE Reviews, 2010, vol. 1, pp. 018005-1-018005-50.
(Continued)

*Primary Examiner* — Jade R Chwasz
(74) *Attorney, Agent, or Firm* — Oliff PLC

(57) ABSTRACT

A digital holographic apparatus includes a first hologram generating unit that generates a first hologram by causing first object light in a first observation direction to interfere with first reference light, the first object light being generated by irradiating an observation object with light having a first wavelength, the first reference light being derived from the light having the first wavelength; a second hologram generating unit that generates a second hologram by causing second object light in a second observation direction that differs from the first observation direction to interfere with second reference light, the second object light being generated by irradiating the observation object with light having a second wavelength, the second reference light being derived from the light having the second wavelength; a first image capturing unit that captures the first hologram; and a second image capturing unit that captures the second hologram.

12 Claims, 28 Drawing Sheets

(52) U.S. Cl.
CPC ........... *G03H 2001/0452* (2013.01); *G03H 2001/266* (2013.01); *G03H 2222/34* (2013.01); *G03H 2226/13* (2013.01)

(58) Field of Classification Search
CPC ........... G03H 1/0005; G03H 1/2294; G03H 2001/005; G03H 2001/0452; G03H 1/0402; G03H 2222/34; G03H 2001/0212; G03H 2225/60; G03H 1/10; G03H 2222/42; G03H 2226/13; G03H 2001/0445; G03H 2001/226
USPC ............... 359/10, 11, 21, 22, 25, 24, 35
See application file for complete search history.

(56) References Cited

U.S. PATENT DOCUMENTS

2014/0132710 A1* 5/2014 Yamaichi ............ G03H 1/0891
348/40
2015/0153559 A1 6/2015 Sato et al.

OTHER PUBLICATIONS

Kries, T., "Applications of Digital Holography: From Microscopy to 3D-Television," J. Europ. Opt. Soc. Rap. Public. Jul. 2012, No. 12006, pp. 12006-1-12006-9.
Mundt et al., "Digital holographic recording and reconstruction of large scale objects for metrology and display," Optical Engineering, Dec. 2010, vol. 49, No. 12, pp. 125801-1-125801-6.

* cited by examiner

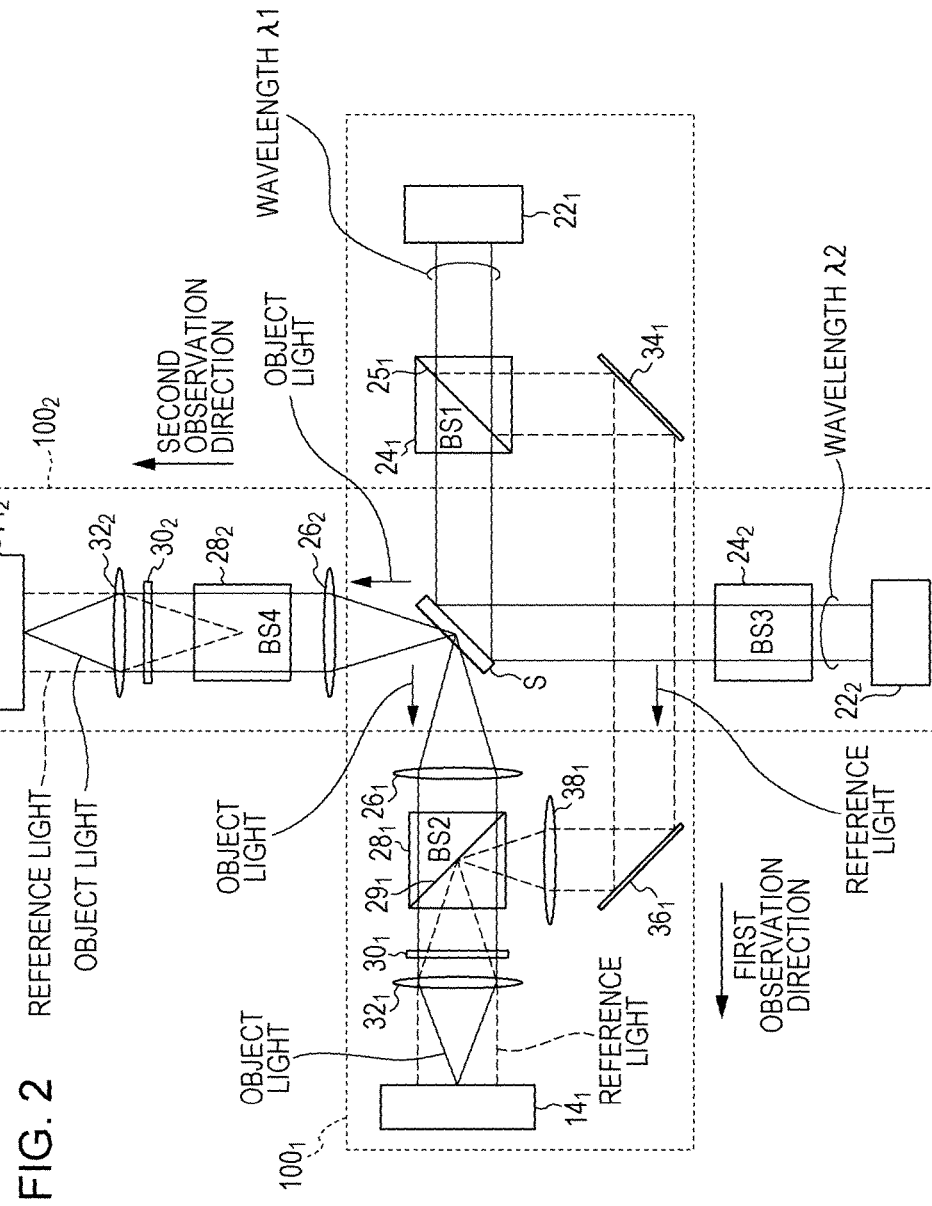

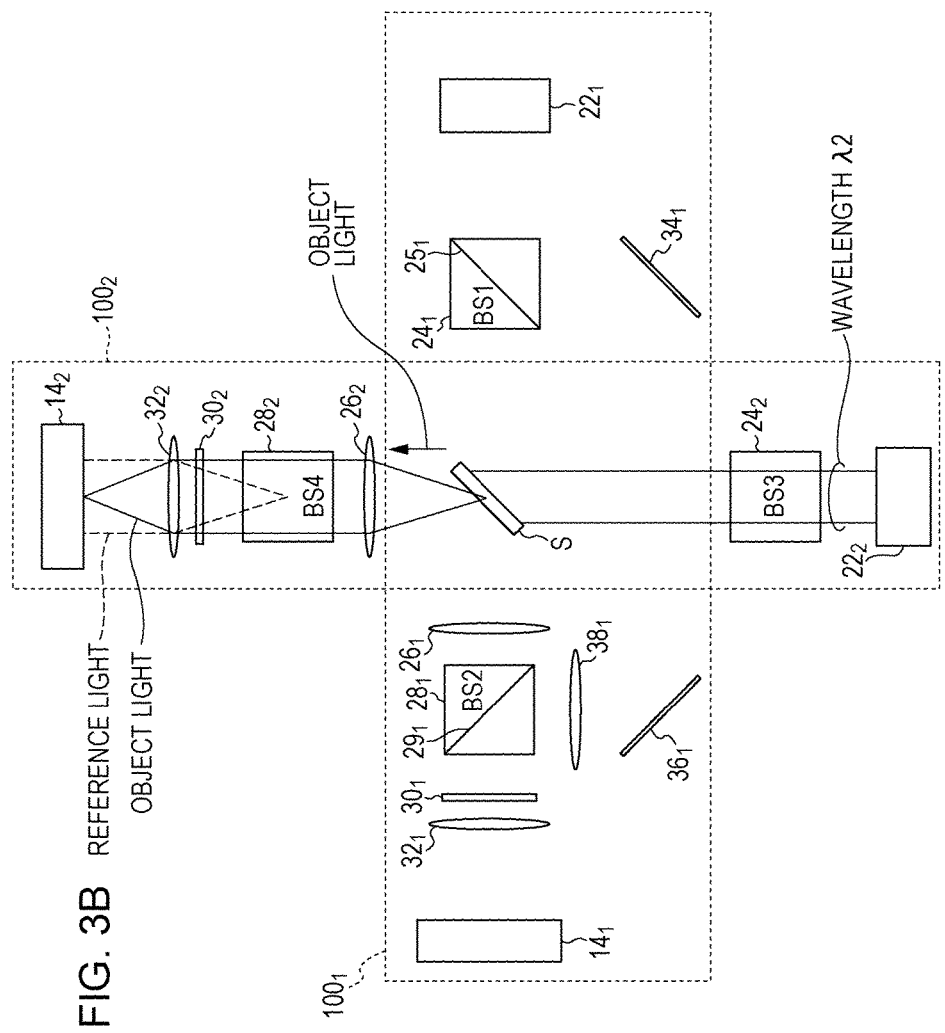

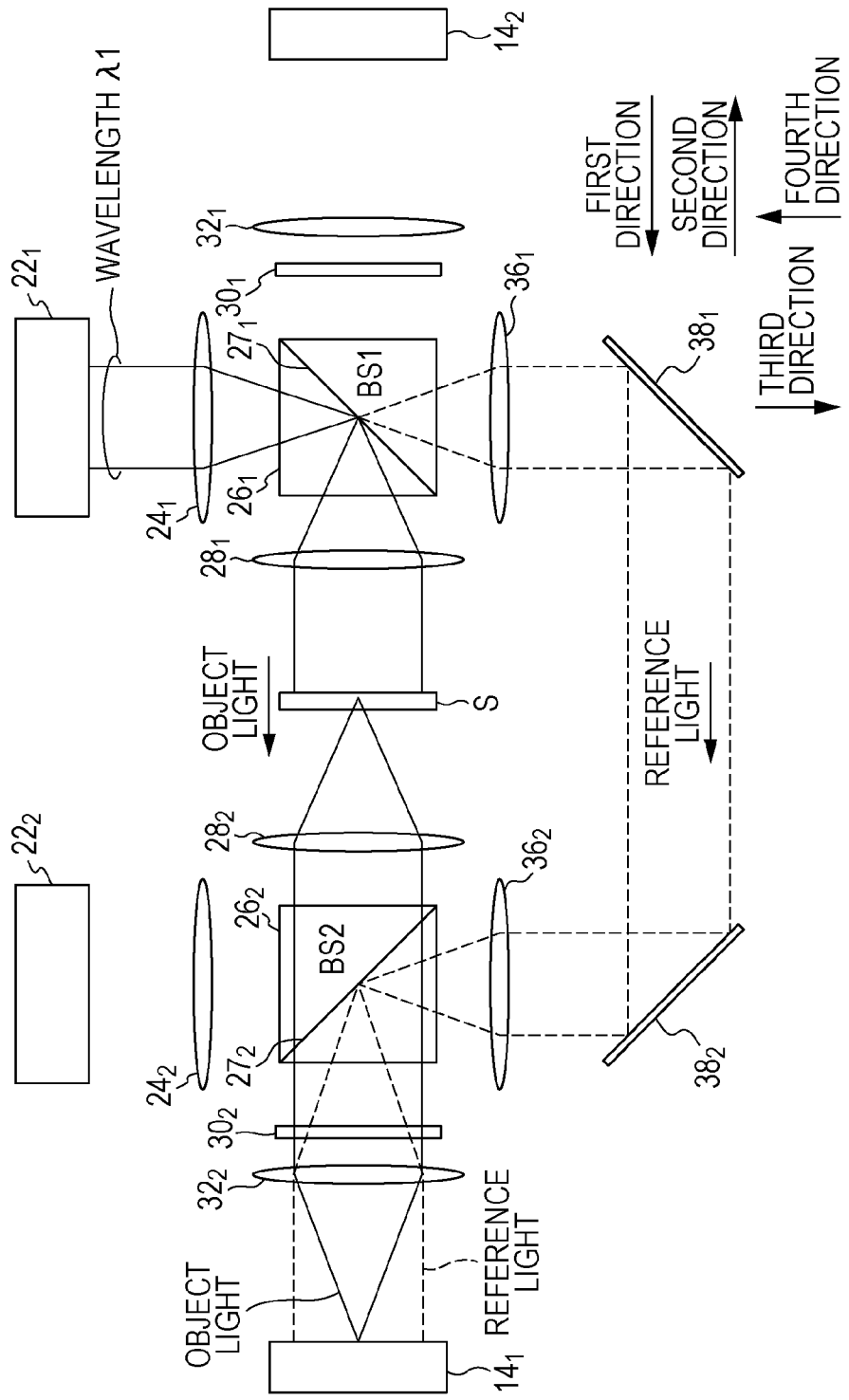

(p: PIXEL SIZE, N: NUMBER OF PIXELS, M: MAGNIFICATION)

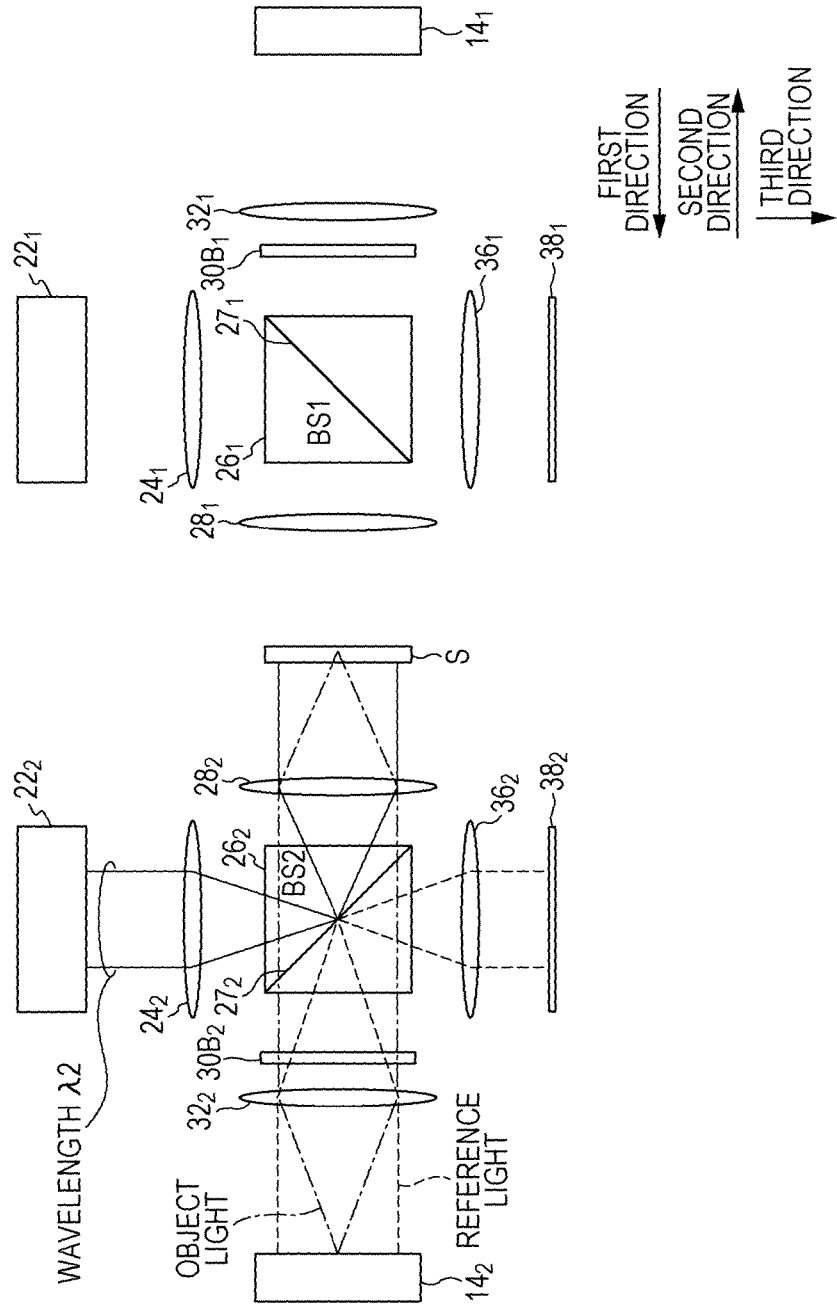

DIGITAL HOLOGRAPHIC APPARATUS

CROSS-REFERENCE TO RELATED APPLICATIONS

This application is based on and claims priority under 35 USC 119 from Japanese Patent Application No. 2016-064332 filed Mar. 28, 2016 and Japanese Patent Application No. 2016-064462 filed Mar. 28, 2016.

BACKGROUND

Technical Field

The present invention relates to a digital holographic apparatus.

SUMMARY

According to an aspect of the invention, there is provided a digital holographic apparatus that includes a first hologram generating unit that generates a first hologram by causing first object light in a first observation direction to interfere with first reference light, the first object light being generated by irradiating an observation object with light having a first wavelength, the first reference light being derived from the light having the first wavelength; a second hologram generating unit that generates a second hologram by causing second object light in a second observation direction that differs from the first observation direction to interfere with second reference light, the second object light being generated by irradiating the observation object with light having a second wavelength, the second reference light being derived from the light having the second wavelength; a first image capturing unit that captures the first hologram; and a second image capturing unit that captures the second hologram.

BRIEF DESCRIPTION OF THE DRAWINGS

Exemplary embodiments of the present invention will be described in detail based on the following figures, wherein:

FIG. 2 is a schematic structural view of an exemplary structure of a hologram generating unit according to a first exemplary embodiment of the present invention;

FIGS. 3A and 3B are each a schematic view of an exemplary operation of the hologram generating unit according to the first exemplary embodiment;

FIGS. 13A and 13B are each a schematic view of an exemplary operation of the hologram generating unit according to the fifth exemplary embodiment;

FIGS. 21A and 21B are each a schematic view of an exemplary operation of the hologram generating unit according to the seventh exemplary embodiment;

DETAILED DESCRIPTION

An exemplary embodiment of the present invention is described in detail below with reference to the drawings.

First Exemplary Embodiment

Digital Holographic Apparatus

Figure 1:
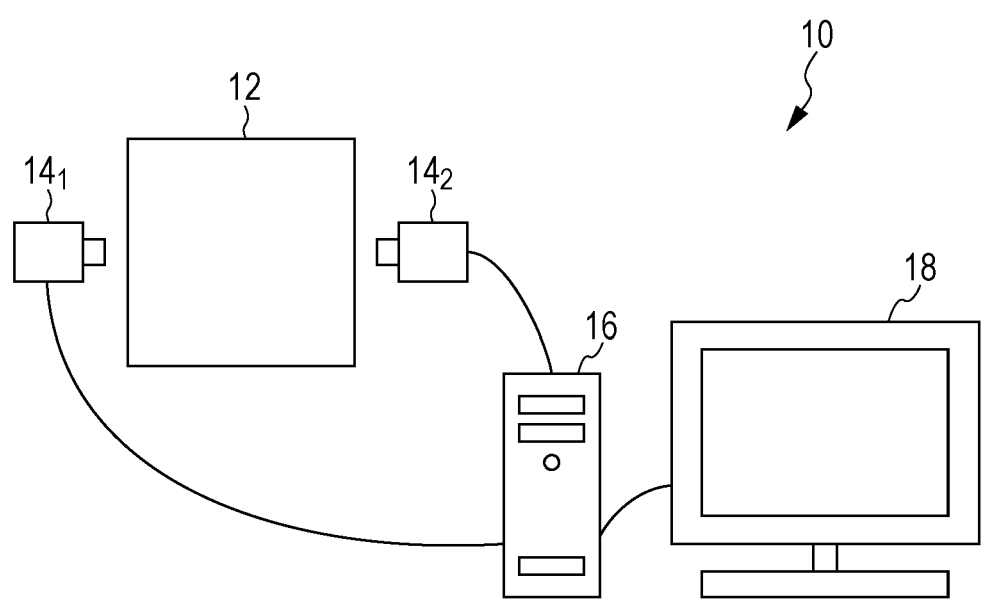
FIG. 1 is a schematic structural view of an exemplary structure of a digital holographic apparatus according to an exemplary embodiment of the present invention.

First, an overall structure of a digital holographic apparatus is described. FIG. 1 is a schematic structural view of an exemplary structure of a digital holographic apparatus 10 according to an exemplary embodiment of the present invention. The digital holographic apparatus 10 includes a hologram generating unit 12 that generates holograms, a first image capturing unit $14_1$ and a second image capturing unit $14_2$ that image the holograms, an image information processing unit 16 that generates reconstructed images by processing image information obtained by capturing the holograms, and a display 18.

The hologram generating unit 12 functions as a first hologram generating unit that causes object light that is obtained in a first observation direction by irradiating an observation object with light having a first wavelength and reference light that is derived from the light having the first wavelength to interfere with each other to generate a first hologram, which is an interference fringe. The first image capturing unit $14_1$ is a digital image capturing element, such as a CCD, and captures the first hologram generated by the first hologram generating unit.

The hologram generating unit 12 also functions as a second hologram generating unit that causes object light that is obtained in a second observation direction by irradiating the observation object with light having a second wavelength and reference light that is derived from the light having the second wavelength to interfere with each other to generate a second hologram, which is an interference fringe. Here, the second wavelength differs from the first wavelength. The second observation direction is a direction that intersects the first observation direction. The second image capturing unit $14_2$ is a digital image capturing element, such as a CCD, and captures the second hologram generated by the second hologram generating unit.

Image information about the first hologram and image information about the second hologram are output from the image information processing unit 16. The image information about the first hologram and the image information about the second hologram are associated with each other, and are stored in a storage device (described later), such as a memory, of the image information processing unit 16. The first wavelength and the second wavelength may be any wavelengths as long as they are separable by a wavelength filter or the like. For example, the first wavelength may be in the range of 500 nm to 560 nm of green light, and the second wavelength may be in the range of 650 nm to 780 nm of red light. The first observation direction and the second observation direction may be desired directions in which an observation object is to be observed. The structure of the hologram generating unit 12 is described below.

The image information processing unit 16 generates a first reconstructed image by processing the image information obtained by capturing the first hologram by the first image capturing unit $14_1$, and generates a second reconstructed image by processing the image information obtained by capturing the second hologram by the second image capturing unit $14_2$. As described above, in the digital holographic technology, the digital image capturing elements image the holograms, and the pieces of image information about the captured holograms are reconstructed in a calculator to obtain reconstructed images having three-dimensional structures. As a reconstruction method, a well-known convolution method or Fresnel's method may be used. For example, methods described in "Digital Holography and Wavefront Sensing, Springer (2015)" by U. Schnars, C. Falldorf, J. Watson, and W. Juptner are used.

The image information processing unit 16 is formed as a computer including a central processing unit (CPU), read-only memory (ROM), random access memory (RAM), and a memory. ROM stores a reconstructing operation program for obtaining the reconstructed images having three-dimensional structures by processing the pieces of image information obtained by capturing the holograms. The CPU reads out the reconstructing operation program stored in ROM, and uses RAM as a work area to execute the reconstructing operation program. The display 18 is, for example, a display disposed as a peripheral unit of the computer. The display 18 displays, for example, the generated reconstructed images. As a peripheral unit, an input device, such as a keyboard, may be provided.

In the exemplary embodiment, the second hologram when the observation object is observed from the second observation direction by irradiating the observation object with the light having the second wavelength is captured at the same time that the first hologram when the observation object is observed from the first observation direction by irradiating the observation object with the light having the first wavelength is captured. Therefore, compared to the case in which the observation object is observed from one direction by irradiating the observation object with light having a single wavelength, it is possible to observe the observation object from desired directions, and to enlarge an observation region including observation regions that are observed at the same time. In other words, blind spots where the object to be observed is not observable are reduced.

The phrase "at same time" in the specification not only includes the case in which the image capturing time of the first hologram and the image capturing time of the second hologram exactly overlap, but also the case in which the image capturing time of the first hologram and the image capturing time of the second hologram partly overlap.

Hologram Generating Unit

Next, a hologram generating unit 12 is described. Here, the description of the hologram generating unit 12 also includes the description of the first image capturing unit $14_1$ and the second image capturing unit $14_2$. FIG. 2 is a schematic structural view of an exemplary structure of the hologram generating unit 12 according to a first exemplary embodiment of the present invention. In the first exemplary embodiment, transmission light transmitted through an observation object S is defined as object light. The hologram generating unit 12 includes a first unit $100_1$ and a second unit $100_2$.

The first unit $100_1$ includes a first light source $22_1$ that projects light having a first wavelength ($\lambda 1$); a dividing optical element $24_1$ having a reflecting surface $25_1$ that divides, transmits, or reflects incident light in accordance with an incidence direction; a lens $26_1$; a dividing optical element $28_1$ having a reflecting surface $29_1$ that divides, combines, transmits, or reflects incident light in accordance with an incidence direction; a wavelength filter $30_1$ that only transmits the light having the first wavelength ($\lambda 1$); a lens $32_1$; the first image capturing unit $14_1$; a reflecting mirror $34_1$; a reflecting mirror $36_1$; and a lens $38_1$. The optical components are disposed on the same substrate.

The second unit $100_2$ includes a second light source $22_2$ that projects light having a second wavelength ($\lambda 2$); a dividing optical element $24_2$ having a reflecting surface (not shown) that divides, transmits, or reflects incident light in accordance with an incidence direction; a lens $26_2$; a dividing optical element $28_2$ having a reflecting surface (not shown) that divides, combines, transmits, or reflects incident light in accordance with an incidence direction; a wavelength filter $30_2$ that only transmits the light having the second wavelength ($\lambda 2$); a lens $32_2$; the second image capturing unit $14_2$; and an optical system (not shown) that forms an optical path for reference light. The optical components are disposed on the same substrate. The optical system that forms the optical path for reference light includes a pair of reflecting mirrors and lenses.

By disposing the first image capturing unit $14_1$ in the first unit $100_1$ and the second image capturing unit $14_2$ in the second unit $100_2$, the size of the entire digital holographic apparatus 10 is reduced. As described below, the first image capturing unit $14_1$ is disposed on an optical axis of the object light having the first wavelength, and the second image capturing unit $14_2$ is disposed on an optical axis of the object light having the second wavelength.

As the dividing optical element $24_1$, the dividing optical element $24_2$, the dividing optical element $28_1$, and the dividing optical element $28_2$, beam splitters or the like may be used. As the wavelength filter $30_1$ and the wavelength filter $30_2$, bandpass filters or the like may be used.

In the first unit $100_1$, the first light source $22_1$, the dividing optical element $24_1$, the lens $26_1$, the dividing optical element $28_1$, the wavelength filter $30_1$, and the lens $32_1$ are disposed in that order along the first observation direction with their optical axes coinciding with each other. The first light source $22_1$ and the dividing optical element $24_1$ are disposed upstream in the first observation direction from the position of the observation object S. The lens $26_1$, the dividing optical element $28_1$, the wavelength filter $30_1$, the lens $32_1$, and the first image capturing unit $14_1$ are disposed downstream in the first observation direction from the position of the observation object S.

The observation object S is held by a holding member (not shown). The lens $26_1$ is disposed such that its focal position is disposed within the observation object S. As described below, the focal position of the lens $26_2$ of the second unit $100_2$ differs from the focal position of the lens $26_1$. The first image capturing unit $14_1$ is disposed such that its image capturing surface is at the focal position of the lens $32_1$.

The reflecting mirror $34_1$ is disposed at a reference light reflection side of the dividing optical element $24_1$. The reflecting mirror $36_1$ and the lens $38_1$ are disposed at a reference light incident side of the dividing optical element $28_1$. A reflecting surface of the reflecting mirror $34_1$ is inclined at an angle of 45 degrees with respect to an optical axis of the reference light reflected by the dividing optical element $24_1$ such that incident light is reflected in the direction of the reflecting mirror $36_1$. A reflecting surface of the reflecting mirror $36_1$ is inclined at an angle of 45 degrees with respect to the optical axis of the reference light reflected by the reflecting mirror $34_1$.

In the second unit $100_2$, the second light source $22_2$, the dividing optical element $24_2$, the lens $26_2$, the dividing optical element $28_2$, the wavelength filter $30_2$, and the lens $32_2$ are disposed in that order along the second observation direction with their optical axes coinciding with each other. The second light source $22_2$ and the dividing optical element $24_2$ are disposed upstream in the second observation direction from the position of the observation object S. The lens $26_2$, the dividing optical element $28_2$, the wavelength filter $30_2$, the lens $32_2$, and the second image capturing unit $14_2$ are disposed downstream in the second observation direction from the position of the observation object S.

The lens $26_2$ is disposed such that its focal position is disposed within the observation object S. As described below, the focal position of the lens $26_1$ of the first unit $100_1$ differs from the focal position of the lens $26_2$. The second image capturing unit $14_2$ is disposed such that its image capturing surface is at the focal position of the lens $32_2$. Although not shown, the optical system that forms the optical path for the reference light is disposed such that the reference light reflected by the dividing optical element $24_2$ is incident upon the dividing optical element $28_2$.

In the exemplary embodiment, the direction of the optical axis of the object light having the first wavelength is defined as the "first observation direction", and the direction of the optical axis of the object light having the second wavelength is defined as the "second observation direction". Therefore, the optical axis of the object light having the first wavelength and the optical axis of the object light having the second wavelength intersect each other. In the illustrated exemplary embodiment, the first observation direction and the second observation direction are orthogonal to each other, and the optical axis of the object light having the first wavelength and the optical axis of the object light having the second wavelength are also orthogonal to each other.

Operation of Hologram Generating Unit

Figure 3A:
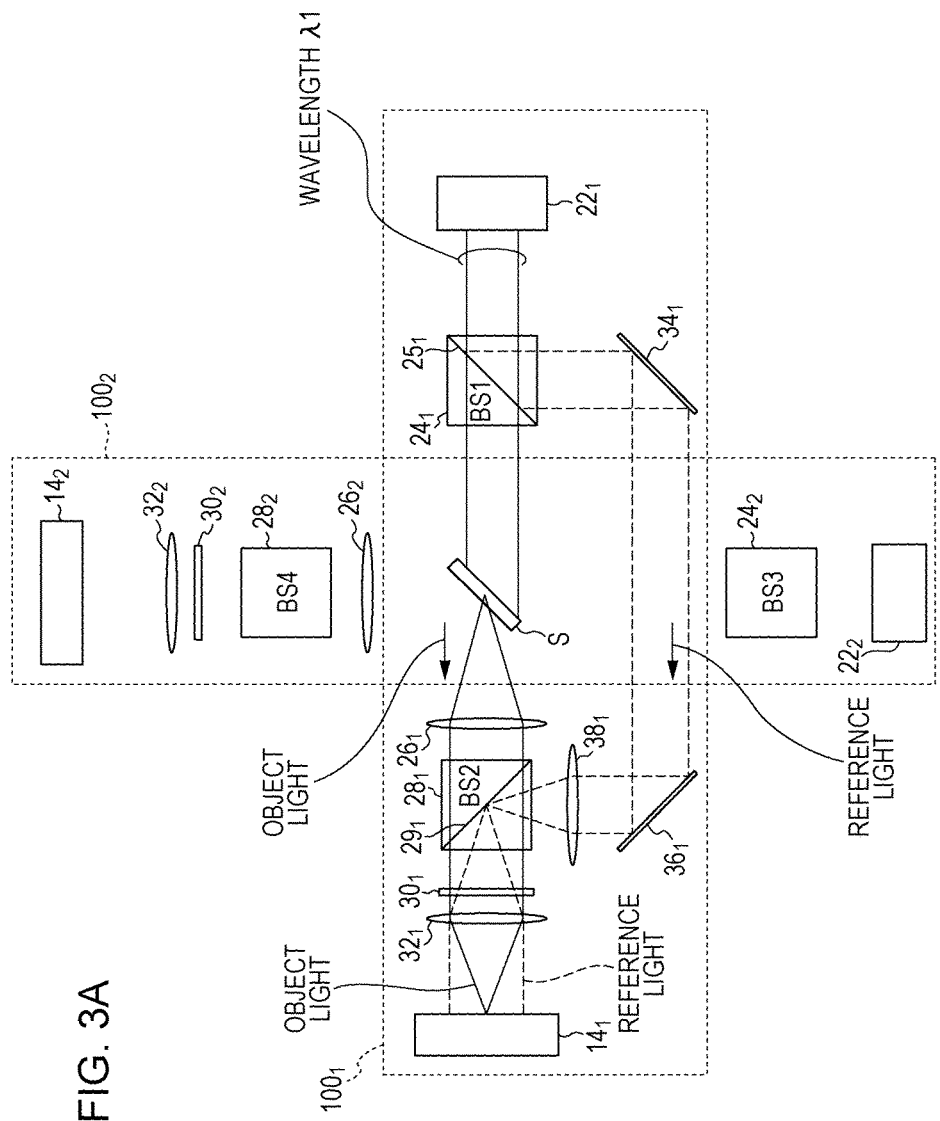

Next, an operation of the hologram generating unit 12 is described. FIGS. 3A and 3B are each a schematic view of an exemplary operation of the hologram generating unit according to the first exemplary embodiment. With reference to FIG. 3A, an operation of the first unit $100_1$ serving as the first hologram generating unit that generates the first hologram by causing the object light having the first wavelength and the reference light having the first wavelength to interfere with each other is described. With reference to FIG. 3B, an operation of the second unit $100_2$ serving as the second hologram generating unit that generates the second hologram by causing the object light having the second wavelength and the reference light having the second wavelength to interfere with each other is described.

First, the operation of the first unit $100_1$ is described. As shown in FIG. 3A, light having the first wavelength and projected as parallel light from the first light source $22_1$ is incident upon the dividing optical element $24_1$. The light having the first wavelength and incident upon the dividing optical element $24_1$ is such that a part thereof is transmitted through the reflecting surface $25_1$, and exits therefrom in the first observation direction. In addition, the light having the first wavelength and incident upon the dividing optical element $24_1$ is such that a remaining part thereof is reflected by the reflecting surface $25_1$. This causes the light having the first wavelength and projected from the first light source $22_1$ to be divided into object light and reference light. The reference light is indicated by dotted lines.

The light (object light) having the first wavelength and transmitted through the dividing optical element $24_1$ illuminates the observation object S while the object light remains parallel light. That is, the light having the first wavelength and illuminating the observation object S is a "plane wave". The light that illuminates the observation object S is scattered when it is transmitted through the observation object S. FIG. 3A illustrates a state in which the light that passes the optical axis is scattered.

The object light having the first wavelength and transmitted through the observation object S is collimated by the lens $26_1$, and is incident upon the dividing optical element $28_1$. The object light having the first wavelength and incident upon the dividing optical element $28_1$ is transmitted through the reflecting surface $29_1$ and exits therefrom in the first observation direction. The wavelength filter $30_1$ removes light having wavelengths other than the first wavelength, and the lens $32_1$ gathers the light to irradiate the image capturing surface of the first image capturing unit $14_1$ with the gathered light.

The light (reference light) having the first wavelength and reflected by the dividing optical element $24_1$ illuminates the reflecting mirror $34_1$, is reflected by the reflecting mirror $34_1$ in the direction of the reflecting mirror $36_1$, is reflected by the reflecting mirror $36_1$ in the direction of the lens $38_1$, is gathered by the lens $38_1$, and is incident upon the dividing optical element $28_1$.

The reference light having the first wavelength and incident upon the dividing optical element $28_1$ is reflected by the reflecting surface $29_1$ in the first observation direction. The wavelength filter $30_1$ removes light having wavelengths other than the first wavelength, and the lens $32_1$ collimates the light to irradiate the image capturing surface of the first image capturing unit $14_1$ with the collimated light.

The object light having the first wavelength and illuminating the image capturing surface of the first image capturing unit $14_1$ and the reference light having the first wavelength and illuminating the image capturing surface of the first image capturing unit $14_1$ interfere with each other to generate an interference fringe at the image capturing surface of the first image capturing unit $14_1$. The first image capturing unit $14_1$ captures, as the first hologram, the interference fringe generated at the image capturing surface.

Next, the operation of the second unit $100_2$ is described. As shown in FIG. 3B, light having the second wavelength and projected as parallel light from the second light source $22_2$ is incident upon the dividing optical element $24_2$. The light having the second wavelength and incident upon the dividing optical element $24_2$ is such that a part thereof is transmitted through the reflecting surface (not shown), and exits therefrom in the second observation direction. In addition, the light having the second wavelength and incident upon the dividing optical element $24_2$ is such that a remaining part thereof is reflected by the reflecting surface (not shown). This causes the light having the second wavelength and projected from the second light source $22_2$ to be divided into object light and reference light. The reference light is indicated by dotted lines.

The light (object light) having the second wavelength and transmitted through the dividing optical element $24_2$ illuminates the observation object S while the object light remains parallel light. That is, the light having the second wavelength and illuminating the observation object S is a "plane wave". The light that illuminates the observation object S is scattered when it is transmitted through the observation object S. FIG. 3B illustrates a state in which the light that passes the optical axis is scattered.

The object light having the second wavelength and transmitted through the observation object S is collimated by the lens $26_2$, and is incident upon the dividing optical element $28_2$. The object light having the second wavelength and incident upon the dividing optical element $28_2$ is transmitted through the reflecting surface and exits therefrom in the second observation direction. The wavelength filter $30_2$ removes light having wavelengths other than the second wavelength, and the lens $32_2$ gathers the light to irradiate the image capturing surface of the second image capturing unit $14_2$ with the gathered light.

The light (reference light) having the second wavelength and reflected by the dividing optical element $24_2$ is transmitted through the optical system (not shown), and is incident upon the dividing optical element $28_2$. The reference light having the second wavelength and incident upon the dividing optical element $28_2$ is reflected by the reflecting surface (not shown) in the second observation direction. The wavelength filter $30_2$ removes light having wavelengths other than the second wavelength, and the lens $32_2$ collimates the light to irradiate the image capturing surface of the second image capturing unit $14_2$ with the collimated light.

The object light having the second wavelength and illuminating the image capturing surface of the second image capturing unit $14_2$ and the reference light having the second wavelength and illuminating the image capturing surface of the second image capturing unit $14_2$ interfere with each other to generate an interference fringe at the image capturing surface of the second image capturing unit $14_2$. The second image capturing unit $14_2$ captures, as the second hologram, the interference fringe generated at the image capturing surface.

In the exemplary embodiment, the operation of the first unit $100_1$ as the first hologram generating unit and the operation of the second unit $100_2$ as the second hologram generating unit are performed at the same time. Since the wavelength of the light having the first wavelength and the wavelength of the light having the second wavelength differ from each other, it is possible to irradiate the observation object with the light having the first wavelength and the light having the second wavelength to generate the object light having the first wavelength and the object light having the second wavelength. The generated object light having the first wavelength and the generated object light having the second wavelength are separated by, for example, the wavelength filters. Therefore, a region including observation regions that are observed at the same time is enlarged.

In the exemplary embodiment, since the object light illuminates the observation object as a plane wave, a wide range of the observation object is uniformly irradiated. Therefore, the brightness of reconstructed images also becomes uniform. For example, when the inside of a plane of the observation object or a wide range in a depth direction of the observation object is to be photographed, a method of irradiating the observation object with the object light as a plane wave is a suitable method.

In the exemplary embodiment, the optical axis of the object light and the optical axis of the reference light having the same wavelength are coaxial (in-line relationship). However, the optical axis of the reference light may be inclined such that the optical axis of the object light and the optical axis of the reference light intersect each other (off-axis relationship). The off-axis relationship makes it easier for first-order diffracted light and zeroth order diffracted light to be separated from each other, and allows noise that is generated at the reconstructed images by the zeroth order diffracted light to be reduced.

For example, in order to obliquely irradiate the observation object with the reference light having the first wavelength, the dividing optical element $28_1$ only needs to be inclined. Alternatively, a deflecting element that changes the optical path of the reference light only needs to be inserted in front of or in back of the wavelength filter $30_1$. The deflecting element may be, for example, an optical element such as a wedge type prism.

Enlargement of a Region that is Observed

Next, the enlargement of a region that is observed is described.

Figure 4A:
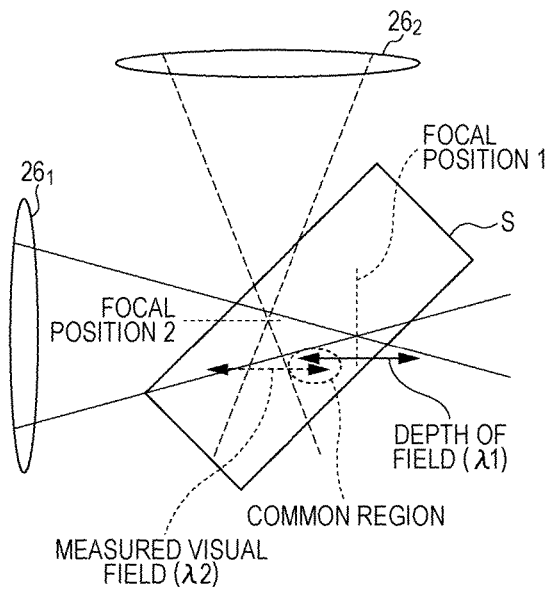
FIG. 4A is a schematic view of a region through which light beams having different wavelengths are transmitted.
Figure 4B:
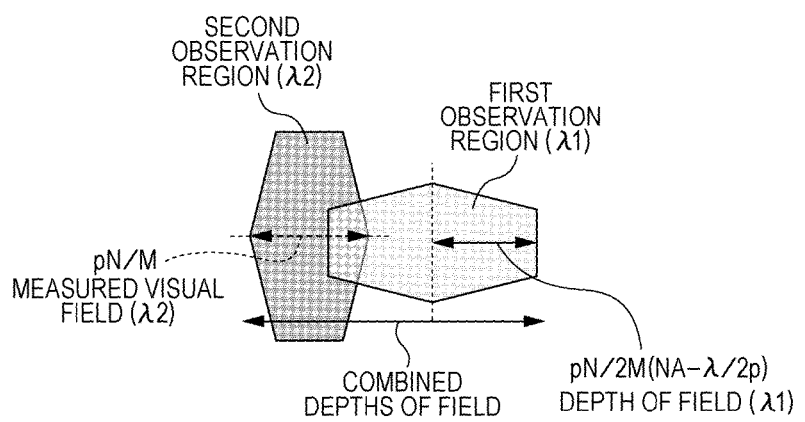
FIG. 4B is a schematic view of observation regions based on the light beams having different wavelengths.

FIG. 4A is a schematic view of a region through which light beams having different wavelengths are transmitted. FIG. 4B is a schematic view of observation regions based on the light beams having different wavelengths. As mentioned in describing the operation of the hologram generating unit as the first hologram generating unit, the object light having the first wavelength and transmitted through the observation object S is collimated by the lens $26_1$. In addition, as mentioned in describing the operation of the hologram generating unit as the second hologram generating unit, the object light having the second wavelength and transmitted through the observation object S is collimated by the lens $26_2$.

Therefore, as shown in FIG. 4A, the object light having the first wavelength is focused at a focal position 1 of the lens $26_1$ in the observation object S; and the object light having the second wavelength is focused at a focal position 2 of the lens $26_2$ in the observation object S. The focal position 1 in the observation object S and the focal position 2 in the observation object S differ from each other. In the exemplary embodiment, the second unit $100_2$ including the lens $26_2$ is moved relative to the first unit $100_1$ including the lens $26_1$ to separate the focal position 1 and the focal position 2 from each other.

FIG. 4A schematically shows the region in the observation object S through which the object light beams are transmitted, and shows a maximum angular range of light beams that are incident upon objective lenses among scattered light beams from the focal positions on the respective optical axes. In FIG. 4A, one of the light beams is incident upon the lens $26_1$ from the focal position 1 in accordance with the NA of the lens $26_1$, which is one of the objective lenses; and the other light beam is incident upon the lens $26_2$, which is the other objective lens, from the focal position 2 in accordance with the NA of the lens $26_2$, which is the other objective lens.

Here, the term "focal depth" refers to the "distance from where the focal position is located on an image capturing element in the direction of the optical axis" at which blurring of an optical image formed when the object light is focused is permitted. In addition, the term "depth of field" refers to the "distance from a focal position in the observation object in the direction of the optical axis (that is, a reconstruction distance from a hologram" at which blurring of an optical image formed when the object light is focused is permitted. That is, the range that is indicated by a thick solid double-headed arrow and that extends between a location in front of and a location in back of the focal position 1 in the direction of the optical axis of the object light having the first wavelength corresponds to a depth of field (λ1) based on the object light having the first wavelength.

In the exemplary embodiment, since the optical axis of the object light having the first wavelength and the optical axis of the object light having the second wavelength intersect each other, the directions of the depths of field of the two object light beams differ from each other. Therefore, in order to express the enlargement of the depths of field, the "depth of field" regarding the object light having the second wavelength is defined as a "measured visual field" instead of the "depth of field". Here, the term "measured visual field" refers to the "length of the observation region in the observation object in the direction of the optical axis of the object light having the first wavelength" at which blurring of an optical image formed when the object light is focused is permitted. The range that is indicated by a thick dotted double-headed arrow with respect to the focal position 2 corresponds to the measured visual field (λ2) based on the object light having the second wavelength.

As shown in FIG. 4B, as seen in cross section including the optical axes of the object light beams, a first observation region (λ1) that is shown using a light color and that is based on the object light having the first wavelength has a shape formed by joining the bases of two trapezoids (hereunder referred to as a "trapezoidal shape") in accordance with the depth of field (λ1) and the NA of the objective lens. A second observation region (λ2) that is shown using a dark color and that is based on the object light having the second wavelength has a trapezoidal shape in accordance with the depth of field (λ2) and the NA of the objective lens. The observation regions have trapezoidal shapes because the observation regions are restricted by the NA of the objective lenses.

Since the focal position 1 and the focal position 2 in the observation object S and their directions differ from each other, the first observation region (λ1) and the second observation region (λ2) differ in position and orientation. Therefore, compared to the case in which the observation object is irradiated with light having a single wavelength, a region including observation regions that are observed at the same time is enlarged to a region in which the first observation region (λ1) and the second observation region (λ2) are connected to each other. The image information processing unit 16 connects the first observation region (λ1) and the second observation region (λ2) to each other (see FIG. 1).

The image information processing unit 16 reads out the image information about the first hologram and the image information about the second hologram that are associated with each other from the storage device, processes the image information about the first hologram to generate the first reconstructed image, and processes the image information about the second hologram to generate the second reconstructed image. By combining the first reconstructed image and the second reconstructed image, the first observation region (λ1) and the second observation region (λ2) are connected to each other. An image in which the observation regions are connected to each other, that is, a composite image of the first reconstructed image and the second reconstructed image is displayed on the display 18.

By combining the depth of field (λ1) and the measured visual field (λ2), the depth of field in the direction of the optical axis of the object light having the first wavelength is increased. When the wavelength is λ, the numerical aperture of the lenses $26_1$ and $26_2$, which are objective lenses, is NA, the diameter of pixels of the image capturing units (that is, the pixel pitch) is p, the number of pixels of the image capturing units is N, and the magnification is M, the depth of field is a range from the focal position and is expressed by the following Formula (1). In Formula (1) below, "N" of the numerator represents the number of pixels:

$$\frac{pN}{2M\left(NA - \frac{\lambda}{2p}\right)} \tag{1}$$

Formula (1) above indicates the range that allows the resolving power that is determined by the NA of the objective lenses to be maintained. Therefore, since the required resolution depends upon use, formulas for the depth of field are not limited to this formula. The measured visual field is expressed by pN/M.

In associating the image information about the first hologram and the image information about the second hologram with each other and in storing them, the three-dimensional coordinates of the focal position 1 where the object light having the first wavelength is focused and the three-dimensional coordinates of the focal position 2 where the object light having the second wavelength is focused may be stored together. For example, when the holding member that holds the observation object S includes a position sensor or the like, the three-dimensional coordinates of the focal positions of the lenses $28_1$ and $28_2$, which are objective lenses, are determined. The three-dimensional coordinates of the focal position 1 and the three-dimensional coordinates of the focal position 2 are used when combining the first reconstructed image and the second reconstructed image.

In the example shown in FIG. 4B, the depth of field (λ1) and the measured visual field (λ2) partly overlap each other (illustrated as a "common region" in FIG. 4A), and the first observation region (λ1) and the second observation region (λ2) also partly overlap each other. The overlap portion is shown using a color that is intermediate between the dark color and the light color. In this case, since the overlap portion is identified on the basis of, for example, pattern matching, the first observation region (λ1) and the measured visual field (λ2) are easily connected to each other. As regards the overlap portion, the image information about the first hologram and the image information about the second hologram are obtained.

Figure 5:
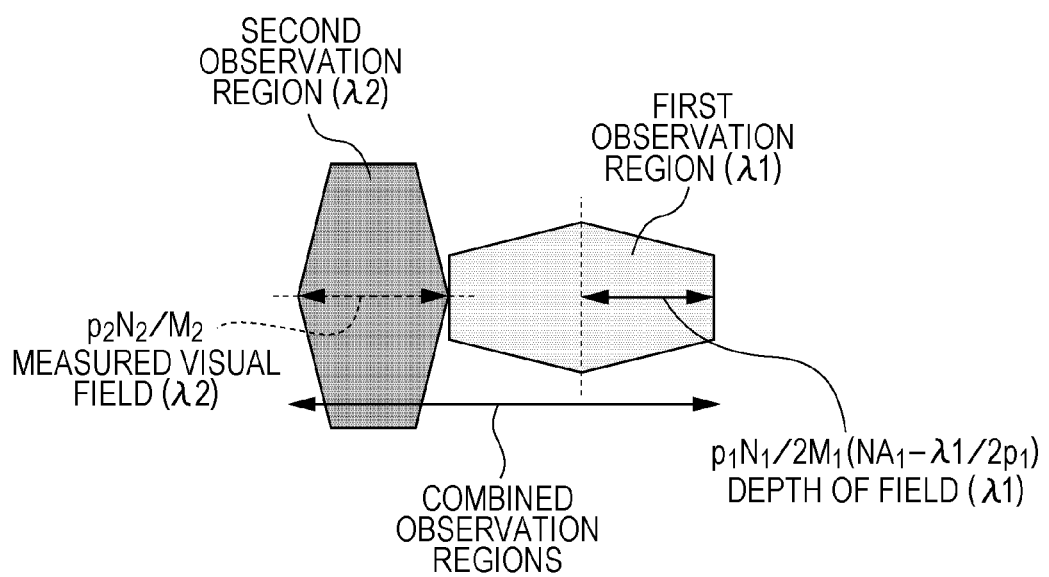
FIG. 5 is a schematic view showing a state in which a region that is observed is enlarged.

The state of overlap of the two observation regions is not limited to that mentioned above. As shown in FIG. 5, the first observation region (λ1) and the measured visual field (λ2) may adjoin each other. Even in this case, the first observation region (λ1) is shown using a light color, and the second observation region (λ2) is shown using a dark color. In this case, the combined depths of field is a maximum, and the size of the region including the connected observation regions is also a maximum.

In the first unit $100_1$, when the numerical aperture is $NA_1$, the diameter of pixel of the image capturing unit is $p_1$, the number of pixels of the image capturing unit is $N_1$, and the magnification is $M_1$, the depth of field (λ1) is a range from the focal position that is expressed by the following Formula (2):

$$\frac{p_1 N_1}{2 M_1 \left( N A_1 - \frac{\lambda 1}{2 p_1} \right)} \quad (2)$$

In the second unit $100_2$, when the diameter of pixel of the image capturing unit is $p_2$, the number of pixels of the image capturing unit is $N_2$, and the magnification is $M_2$, the measured visual field (λ2) is expressed by $p_2 N_2/M_2$.

Figure 6:
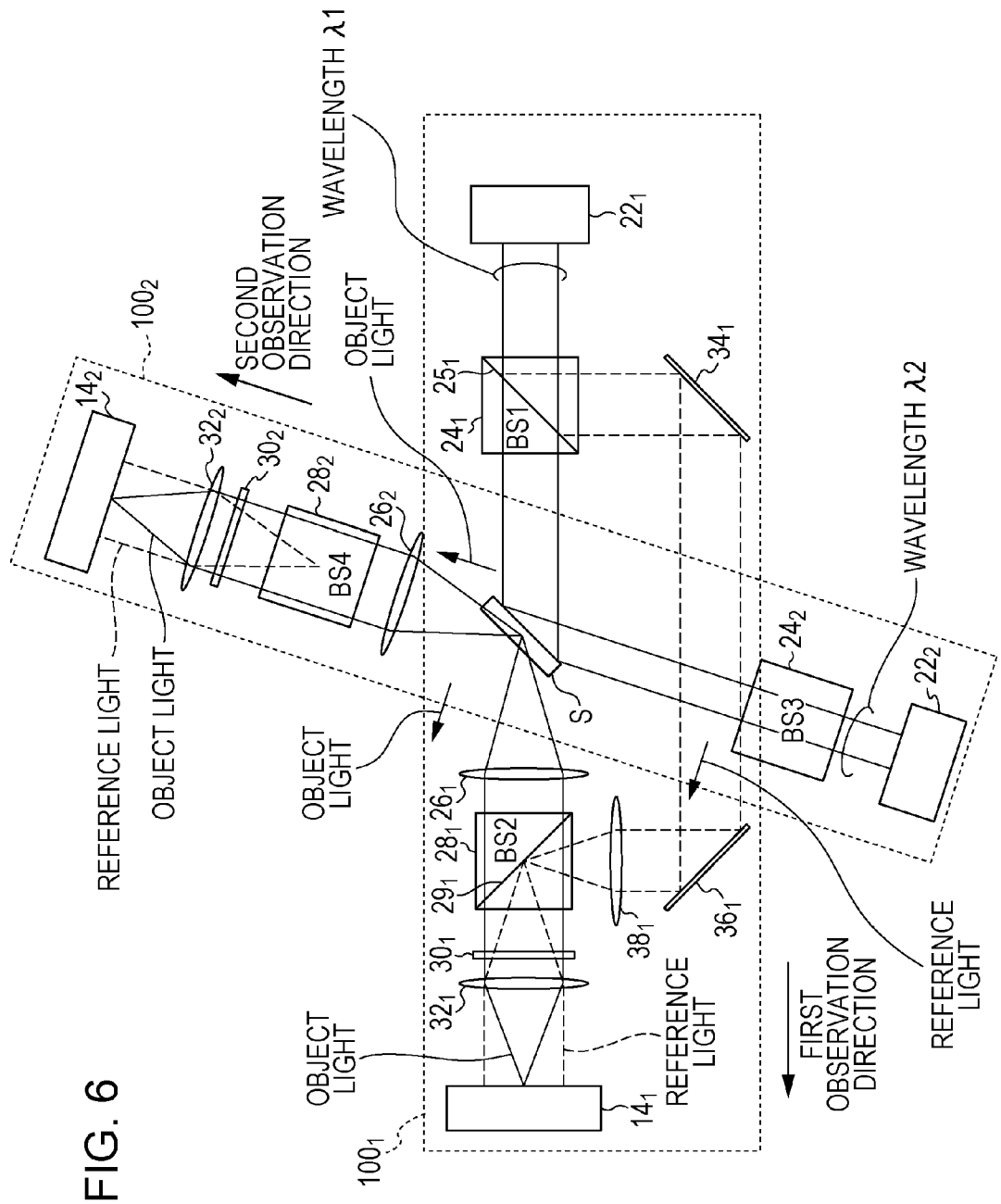
FIG. 6 is a schematic structural view of another exemplary structure of the hologram generating unit according to the first exemplary embodiment.

The first observation direction and the second observation direction may intersect each other at an angle other than 90 degrees. That is, the optical axis of the object light having the first wavelength and the optical axis of the object light having the second wavelength may intersect each other at an angle other than 90 degrees. FIG. 6 is a schematic structural view of another exemplary structure of the hologram generating unit according to the first exemplary embodiment. Except that the angle of intersection between the first observation direction (the direction of the optical axis of the object light having the first wavelength) and the second observation direction (the optical axis of the object light having the second wavelength) is greater than 90 degrees, the structure of the hologram generating unit is the same as the structure of the hologram generating unit shown in FIG. 2. Therefore, corresponding parts are given the same reference numerals, and are not described.

Figure 7:
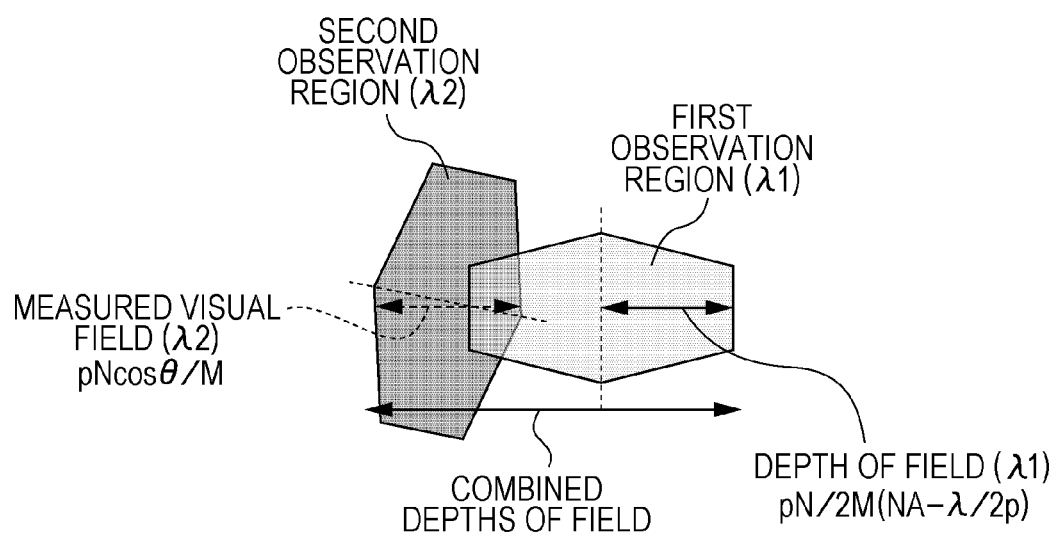
FIG. 7 is a schematic view showing a state in which a region that is observed is enlarged.

FIG. 7 is a schematic view showing a state in which a region that is observed is enlarged. Even here, a first observation region (λ1) is shown using a light color, a second observation region (λ2) is shown using a dark color, and an overlap portion between the two regions is shown using a color that is intermediate between the dark color and the light color. Since the intersection angle is different, the position and the direction of a focal position 2 differ from those in the example shown in FIG. 4B. Therefore, the position and the orientation of the second observation region (λ2) differ from those in the example shown in FIG. 4B. A measured visual field (λ2) in this case is not expressed by pN/M, but is expressed by pNcosθ/M, with θ being the intersection angle. Therefore, the combined depths of field and the range of the connected observation regions also differ.

Second Exemplary Embodiment

Figure 8:
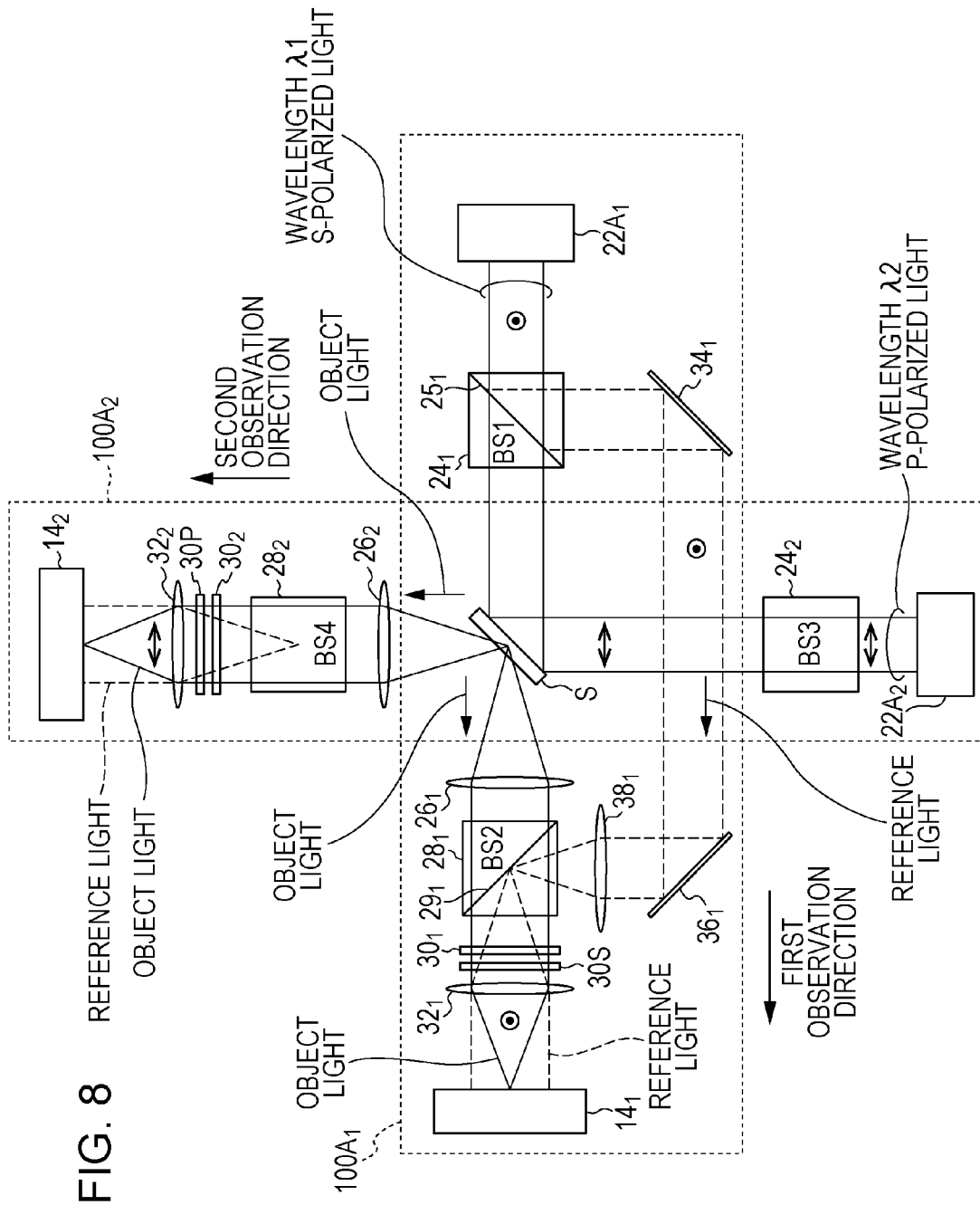
FIG. 8 is a schematic structural view of an exemplary structure of a hologram generating unit according to a second exemplary embodiment of the present invention.

FIG. 8 is a schematic structural view of an exemplary structure of a hologram generating unit 12 according to a second exemplary embodiment of the present invention. Except that a digital holographic apparatus according to the second exemplary embodiment includes the hologram generating unit 12 having a different structure in that object light is obtained by irradiating an observation object with light having different wavelengths and different polarization directions, the structure of the digital holographic apparatus according to the second exemplary embodiment is the same as the structure of the digital holographic apparatus according to the first exemplary embodiment. Therefore, corresponding structural features are given the same reference numerals, and are not described. Even in the second exemplary embodiment, as in the first exemplary embodiment, transmission light transmitted through the observation object is defined as object light. Light with which the observation object is irradiated is a plane wave.

The hologram generating unit 12 according to the second exemplary embodiment includes a first unit $100A_1$ and a second unit $100A_2$. Except that, in the first unit $100A_1$, a first light source $22A_1$ that projects "light having a first wavelength and being s-polarized light" is disposed in place of the first light source $22_1$ that projects light having the first wavelength, and a polarizing filter 30S that transmits only s-polarized light is inserted between a wavelength filter $30_1$ and a lens $32_1$, the first unit $100A_1$ has the same structural features as the first unit $100_1$ shown in FIG. 2. Therefore, the same structural features are not described.

Except that, in the second unit $100A_2$, a second light source $22A_2$ that projects "light having a second wavelength and being p-polarized light" is disposed in place of the second light source $22_2$ that projects light having the second wavelength, and a polarizing filter 30P that transmits only p-polarized light is inserted between a wavelength filter $30_2$ and a lens $32_2$, the second unit $100A_2$ has the same structural features as the second unit $100_2$ shown in FIG. 2. Therefore, the same structural features are not described.

In the second exemplary embodiment, as in the first exemplary embodiment, a first observation direction and a second observation region intersect each other, and an optical axis of object light having the first wavelength and an optical axis of object light having the second wavelength also intersect each other. In the second exemplary embodiment, as in the first exemplary embodiment, the first unit $100A_1$ and the second unit $100A_2$ are disposed such that a focal position of a lens $26_2$ differs from a focal position of a lens $26_1$.

Operation of Hologram Generating Unit

Except that the "light having the first wavelength and being s-polarized light" is used in place of the light having the first wavelength, and the "light having the second wavelength and being p-polarized light" is used in place of the light having the second wavelength, the operation of the hologram generating unit according to the second exemplary embodiment is substantially the same as the operation of the hologram generating unit according to the first exemplary embodiment. Therefore, only differences are described.

In the first unit $100A_1$, object light that has the first wavelength and is s-polarized light, and that is incident upon a dividing optical element $28_1$ is transmitted through a reflecting surface $29_1$, and exits therefrom in the first observation direction. Then, the wavelength filter $30_1$ removes light having wavelengths other than the first wavelength, and the polarizing filter 30S removes light other than the s-polarized light. Then, the lens $32_1$ gathers the light, and an image capturing surface of a first image capturing unit $14_1$ is irradiated with the gathered light.

On the other hand, reference light that has the first wavelength and that is s-polarized light, and that is incident upon the dividing optical element $28_1$ is reflected by the reflecting surface $29_1$ in the first observation direction. Then, the wavelength filter $30_1$ removes light having wavelengths other than the first wavelength, and the polarizing filter 30S removes light other than the s-polarized light. Then, the lens $32_1$ collimates the light, and the image capturing surface of the first image capturing unit $14_1$ is irradiated with the collimated light.

The object light that has the first wavelength and that is s-polarized light, and that illuminates the image capturing surface of the first image capturing unit $14_1$ and the reference light that has the first wavelength and that is s-polarized light, and that illuminates the image capturing surface of the first image capturing unit $14_1$ interfere with each other to generate an interference fringe at the image capturing surface of the first image capturing unit $14_1$. The first image capturing unit $14_1$ captures, as a first hologram, the interference fringe generated at the image capturing surface.

Next, in the second unit $100A_2$, object light that has the second wavelength and that is p-polarized light, and that is incident upon a dividing optical element $28_2$ is transmitted through a reflecting surface (not shown) and exits therefrom in the second observation direction. Then, the wavelength filter $30_2$ removes light having wavelengths other than the second wavelength, and the polarizing filter 30P removes light other than the p-polarized light. The lens $32_2$ gathers the light, and an image capturing surface of a second image capturing unit $14_2$ is irradiated with the gathered light.

On the other hand, reference light that has the second wavelength and that is p-polarized light, and that is incident upon the dividing optical element $28_2$ is reflected by a reflecting surface (not shown) in the second observation direction. The wavelength filter $30_2$ removes light having wavelengths other than the second wavelength, and the polarizing filter 30P removes light other than the p-polarized light. The lens $32_2$ collimates the light, and the image capturing surface of the second image capturing unit $14_2$ is irradiated with the collimated light.

The object light that has the second wavelength and that is p-polarized light, and that is incident upon the second image capturing unit $14_2$ and the reference light that has the second wavelength and that is p-polarized light, and that is incident upon the second image capturing unit $14_2$ interfere with each other to generate an interference fringe at the image capturing surface of the second image capturing unit $14_2$. The second image capturing unit $14_2$ captures, as a second hologram, the interference fringe generated at the image capturing surface.

In the second exemplary embodiment, as in the first exemplary embodiment, the operation of the first unit $100A_1$ as a first hologram generating unit and the operation of the second unit $100A_2$ as a second hologram generating unit are performed at the same time. As a result, a region including observation regions that are observable at the same time is enlarged. In the second exemplary embodiment, as in the first exemplary embodiment, since the object light illuminates the observation object as a plane wave, a wide range of the observation object is uniformly irradiated. Therefore, the brightness of reconstructed images also becomes uniform.

In particular, in the second exemplary embodiment, the light having the first wavelength and the light having the second wavelength not only have different wavelengths but also have different polarization directions. Therefore, the "object light that has the first wavelength and that is s-polarized light" derived from the "light that has the first wavelength and that is s-polarized light" and the "object light that has the second wavelength and that is p-polarized light" derived from the "light that has the second wavelength and that is p-polarized light" are separated from each other by, for example, the wavelength filters and the polarizing filters. Therefore, by allowing the light to be transmitted through the polarizing filters in addition to through the wavelength filters, noise that is not capable of being completely removed by the wavelength filters is removed.

Third Exemplary Embodiment

Figure 9:
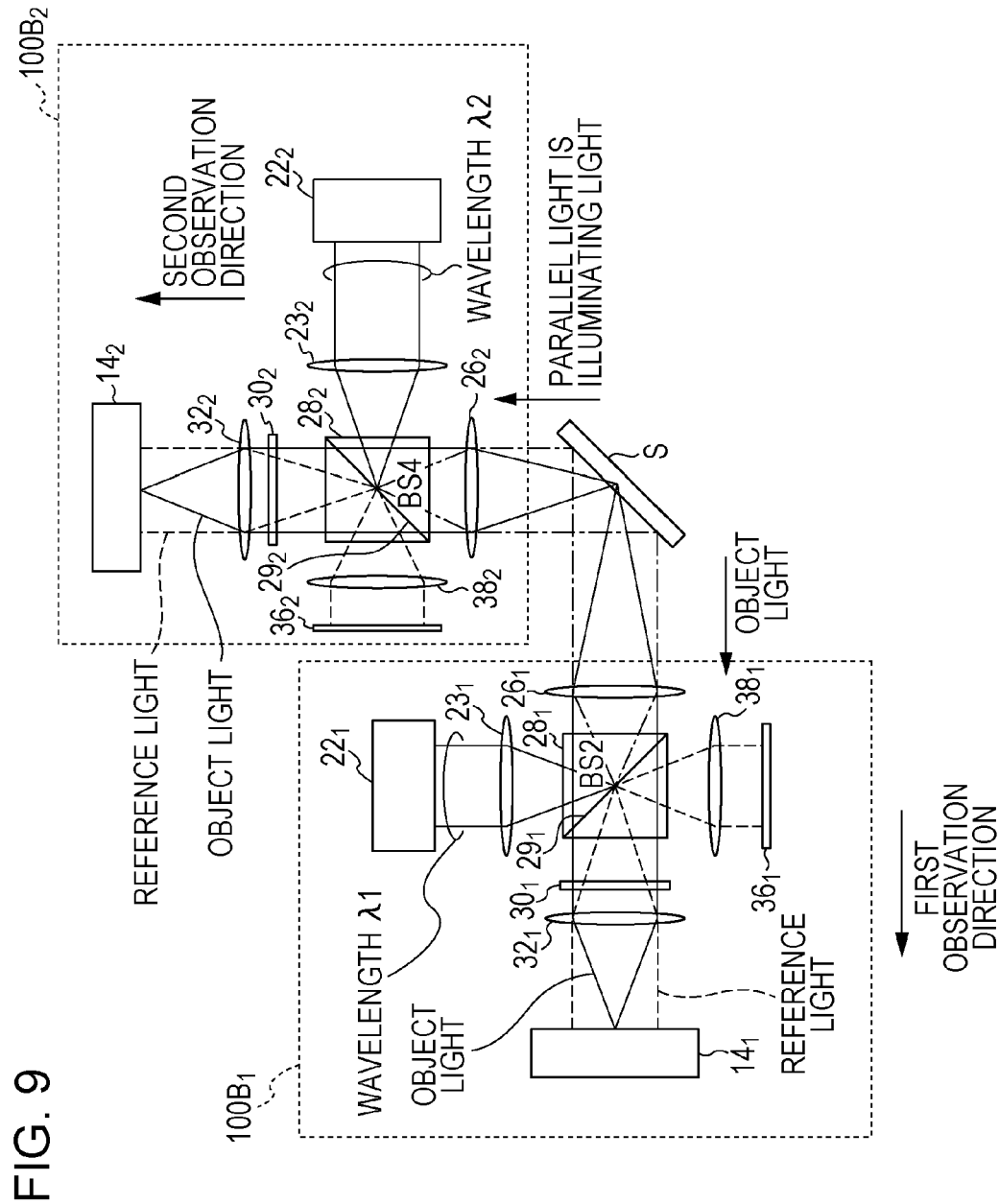
FIG. 9 is a schematic structural view of an exemplary structure of a hologram generating unit according to a third exemplary embodiment of the present invention.

FIG. 9 is a schematic structural view of an exemplary structure of a hologram generating unit 12 according to a third exemplary embodiment of the present invention. Except that a digital holographic apparatus 10 according to the third exemplary embodiment includes the hologram generating unit 12 having a different structure in that reflection light reflected by an observation object is defined as object light, the structure of the digital holographic apparatus according to the third exemplary embodiment is the same as the structure of the digital holographic apparatus according to the first exemplary embodiment. Therefore, corresponding structural features are given the same reference numerals, and are not described. Even in the third exemplary embodiment, as in the first exemplary embodiment, transmission light that illuminates the observation object is a plane wave.

The hologram generating unit 12 according to the third exemplary embodiment includes a first unit $100B_1$ and a second unit $100B_2$. In the first unit $100B_1$, a dividing optical element $24_1$ and a reflecting mirror $34_1$ are not included, and a lens $23_1$ is added. In addition, a light source $22_1$, the lens $23_1$, a dividing optical element $28_1$, and a lens $38_1$, are disposed in that order with their optical axes coinciding with each other such that an optical axis of an optical system thereof is orthogonal to an optical axis of object light. Further, a reflecting mirror $36_1$ is disposed such that a reflecting surface is orthogonal to the optical axis of the optical system to reflect incident light in the direction of the lens $38_1$.

In the second unit $100B_2$, a dividing optical element $24_2$ and a reflecting mirror $34_2$ are not included, and a lens $23_2$ is added. In addition, a light source $22_2$, the lens $23_2$, a dividing optical element $28_2$, and a lens $38_2$, are disposed in that order with their optical axes coinciding with each other such that an optical axis of an optical system thereof is orthogonal to an optical axis of object light. Further, a reflecting mirror $36_2$ is disposed such that a reflecting surface is orthogonal to the optical axis of the optical system to reflect incident light in the direction of the lens $38_2$.

In the third exemplary embodiment, as in the first exemplary embodiment, a first observation direction and a second observation region intersect each other, and an optical axis of object light having a first wavelength and an optical axis of object light having a second wavelength also intersect each other. In the third exemplary embodiment, as in the first exemplary embodiment, the first unit $100B_1$ and the second unit $100B_2$ are disposed such that a focal position of a lens $26_2$ differs from a focal position of a lens $26_1$.

In the third exemplary embodiment, the optical components of the first unit $100B_1$ are disposed together in one place in the first observation direction with respect to the position of an observation object S, and the optical components of the second unit $100B_2$ are disposed together in one place in the second observation direction with respect to the position of the observation object S. This reduces the size of the entire digital holographic apparatus 10.

Operation of Hologram Generating Unit

Figure 10A:
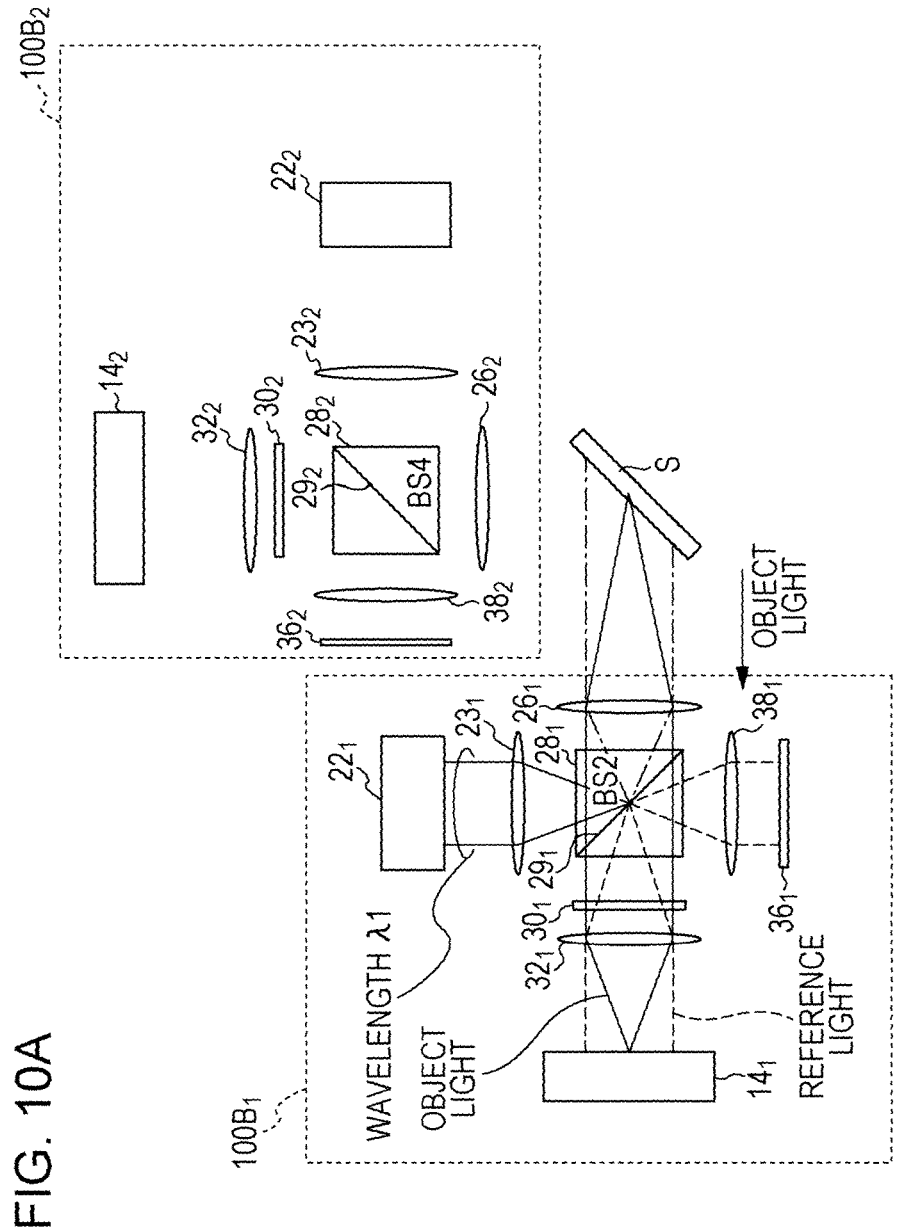
FIGS. 10A and 10B are each a schematic view of an exemplary operation of the hologram generating unit according to the third exemplary embodiment.
Figure 10B:
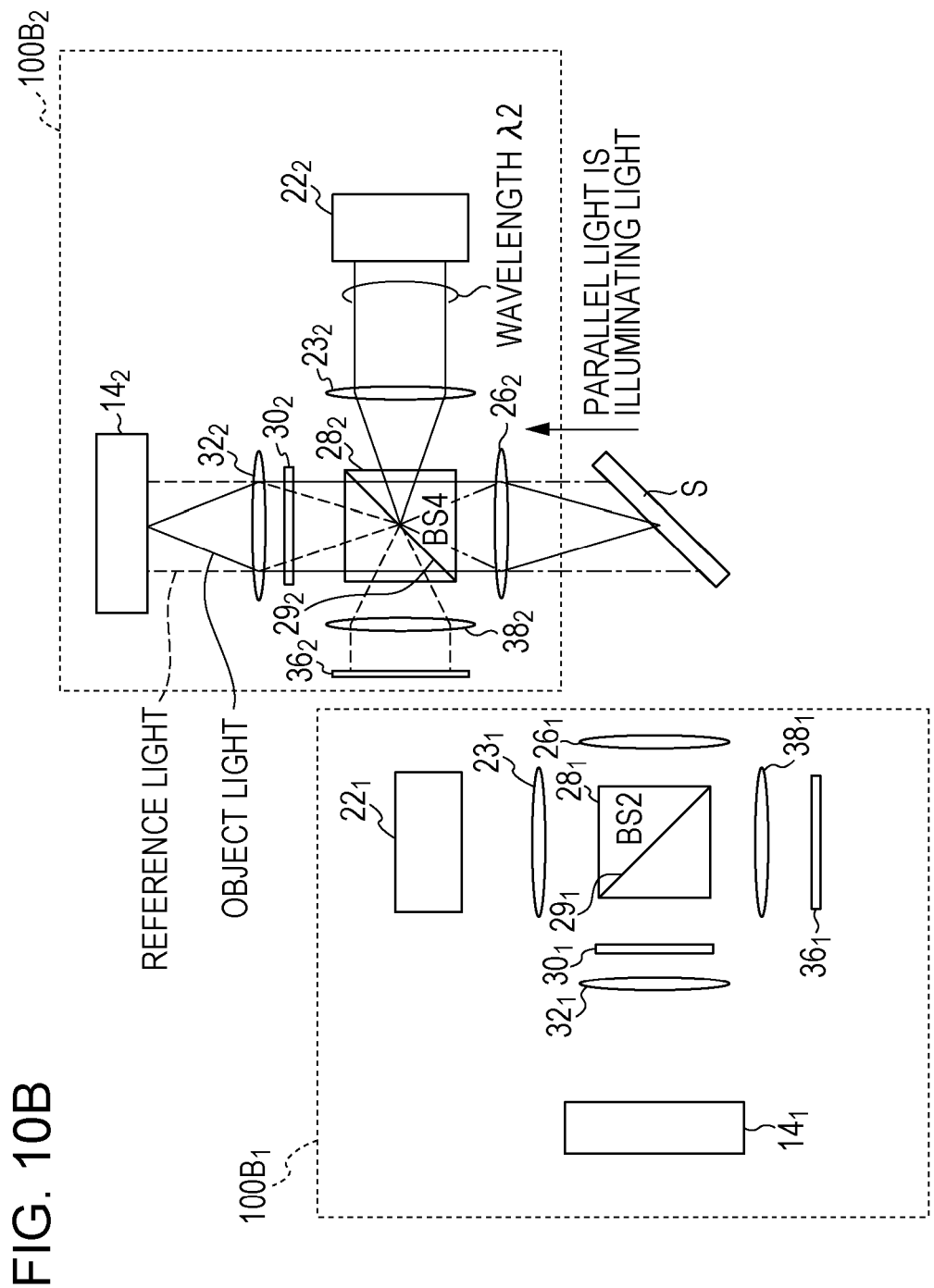

Next, the operation of the hologram generating unit 12 is described. FIGS. 10A and 10B are each a schematic view of an exemplary operation of the hologram generating unit according to the third exemplary embodiment. FIG. 10A illustrates the operation of the first unit $100B_1$ as a first hologram generating unit that generates a first hologram by causing the object light having the first wavelength and reference light having the first wavelength to interfere with each other. FIG. 10B illustrates the operation of the second unit $100B_2$ as a second hologram generating unit that generates a second hologram by causing the object light having the second wavelength and reference light having the second wavelength to interfere with each other.

First, the operation of the first unit $100B_1$ is described. As shown in FIG. 10A, light having the first wavelength and projected as parallel light from the first light source $22_1$ is gathered by the lens $23_1$, and is incident upon the dividing optical element $28_1$. The light having the first wavelength and incident upon the dividing optical element $28_1$ is such that a part thereof is reflected by a reflecting surface $29_1$ in the direction of the lens $26_1$. In addition, the light having the first wavelength and incident upon the dividing optical element $28_1$ is such that a remaining part thereof is transmitted through the reflecting surface $29_1$ and exits therefrom in the direction of the lens $38_1$. This causes the light having the first wavelength and projected from the first light source $22_1$ to be divided into object light and reference light. The object light is indicated by alternate long and short dash lines, and the reference light is indicated by dotted lines.

The light (object light) having the first wavelength and reflected by the dividing optical element $28_1$ is collimated by the lens $26_1$ and illuminates the observation object S. That is, the light having the first wavelength and illuminating the observation object S is a "plane wave". The light that illuminates the observation object S is scattered when it is reflected by the observation object S. FIG. 10A illustrates a state in which the light that passes the optical axis is scattered. The object light after being reflected by the observation object S is indicated by a solid line.

The object light having the first wavelength and reflected by the observation object S is collimated by the lens $26_1$, and is incident upon the dividing optical element $28_1$. The object light having the first wavelength and incident upon the dividing optical element $28_1$ is transmitted through the reflecting surface $29_1$ and exits therefrom in the first observation direction. The wavelength filter $30_1$ removes light having wavelengths other than the first wavelength, and the lens $32_1$ gathers the light to irradiate an image capturing surface of a first image capturing unit $14_1$ with the gathered light.

The light (reference light) having the first wavelength and transmitted through the dividing optical element $28_1$ illuminates the reflecting mirror $36_1$, is collimated by the lens $38_1$, illuminates the reflecting mirror $36_1$, is reflected by the reflecting mirror $36_1$ in the direction of the lens $38_1$, is gathered by the lens $38_1$, and is incident upon the dividing optical element $28_1$.

The reference light having the first wavelength and incident upon the dividing optical element $28_1$ is reflected by the reflecting surface $29_1$ in the first observation direction. The wavelength filter $30_1$ removes light having wavelengths other than the first wavelength, and the lens $32_1$ collimates the light to irradiate the image capturing surface of the first image capturing unit $14_1$ with the collimated light.

The object light having the first wavelength and illuminating the image capturing surface of the first image capturing unit $14_1$ and the reference light having the first wavelength and illuminating the image capturing surface of the first image capturing unit $14_1$ interfere with each other to generate an interference fringe at the image capturing surface of the first image capturing unit $14_1$. The first image capturing unit $14_1$ captures, as the first hologram, the interference fringe generated at the image capturing surface.

In the third exemplary embodiment, as in the first exemplary embodiment, the first observation direction and the second observation region intersect each other, and the optical axis of the object light having the first wavelength and the optical axis of the object light having the second wavelength also intersect each other. In the third exemplary embodiment, as in the first exemplary embodiment, the first unit $100B_1$ and the second unit $100B_2$ are disposed such that the focal position of the lens $26_2$ differs from the focal position of the lens $26_1$.

Next, the operation of the second unit $100B_2$ is described. As shown in FIG. 10B, light having the second wavelength and projected as parallel light from the second light source $22_2$ is gathered by the lens $23_2$, and is incident upon the dividing optical element $28_2$. The light having the second wavelength and incident upon the dividing optical element $28_2$ is such that a part thereof is reflected by a reflecting surface $29_2$ in the direction of the lens $26_2$. In addition, the light having the second wavelength and incident upon the dividing optical element $28_2$ is such that a remaining part thereof is transmitted through the reflecting surface $29_2$ and exits therefrom in the direction of the lens $38_2$. This causes the light having the second wavelength and projected from the second light source $22_2$ to be divided into object light and reference light. The object light is indicated by alternate long and short dash lines, and the reference light is indicated by dotted lines.

The light (object light) having the second wavelength and reflected by the dividing optical element $28_2$ is collimated by the lens $26_2$ and illuminates the observation object S. That is, the light having the second wavelength and illuminating the observation object S is a "plane wave". The light that illuminates the observation object S is scattered when it is reflected by the observation object S. FIG. 10B illustrates a state in which the light that passes the optical axis is scattered. The object light after being reflected by the observation object S is indicated by a solid line.

The object light having the second wavelength and reflected by the observation object S is collimated by the lens $26_2$, and is incident upon the dividing optical element $28_2$. The object light having the second wavelength and incident upon the dividing optical element $28_2$ is transmitted through the reflecting surface $29_2$ and exits therefrom in the second observation direction. A wavelength filter $30_2$ removes light having wavelengths other than the second wavelength, and a lens $32_2$ gathers the light to irradiate an image capturing surface of a second image capturing unit $14_2$ with the gathered light.

The light (reference light) having the second wavelength and transmitted through the dividing optical element $28_2$ is collimated by the lens $38_2$, illuminates the reflecting mirror $36_2$, is reflected by the reflecting mirror $36_2$ in the direction of the lens $38_2$, is gathered by the lens $38_2$, and is incident upon the dividing optical element $28_2$.

The reference light having the second wavelength and incident upon the dividing optical element $28_2$ is reflected by the reflecting surface $29_2$ in the second observation direction. The wavelength filter $30_2$ removes light having wavelengths other than the second wavelength, and the lens $32_2$ collimates the light to irradiate the image capturing surface of the second image capturing unit $14_2$ with the collimated light.

The object light having the second wavelength and illuminating the image capturing surface of the second image capturing unit $14_2$ and the reference light having the second wavelength and illuminating the image capturing surface of the second image capturing unit $14_2$ interfere with each other to generate an interference fringe at the image capturing surface of the second image capturing unit $14_2$. The second image capturing unit $14_2$ captures, as the second hologram, the interference fringe generated at the image capturing surface.

In the third exemplary embodiment, as in the first exemplary embodiment, the operation of the first unit $100B_1$ as the first hologram generating unit and the operation of the second unit $100B_2$ as the second hologram generating unit are performed at the same time. As a result, a region including observation regions that are observable at the same time is enlarged. In the third exemplary embodiment, as in the first exemplary embodiment, since the object light illuminates the observation object as a plane wave, a wide range of the observation object is uniformly irradiated. Therefore, the brightness of reconstructed images also becomes uniform.

In particular, in the third exemplary embodiment, since the reflection light reflected by the observation object is defined as the object light, a bright image (for example, having a high SN ratio) is obtained compared to the case in which the transmission light is defined as the object light. This is because, since the object light is generated at the surface of the observation object, the SN ratio of the object light is not reduced by absorption and scattering of the light in the observation object unlike the case in which the transmission light is defined as the object light.

Fourth Exemplary Embodiment

Figure 11:
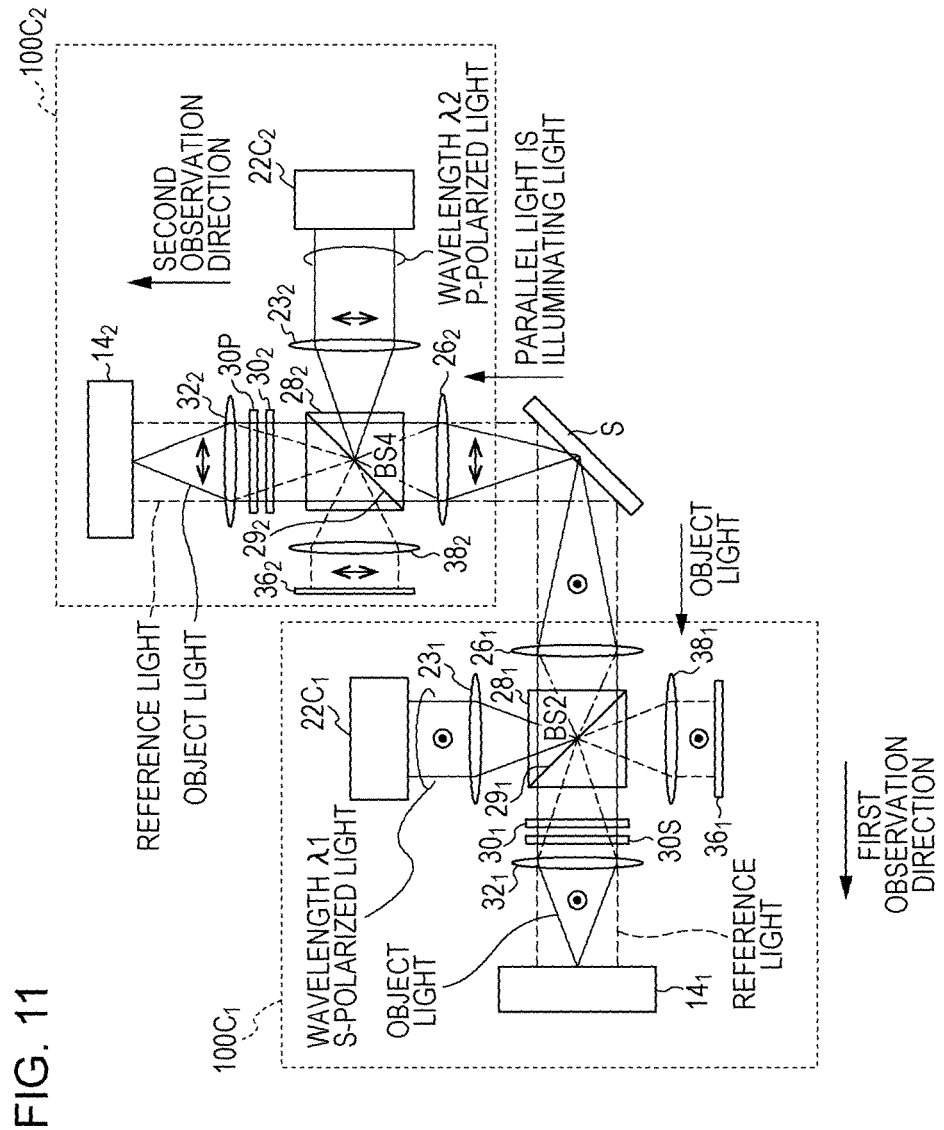
FIG. 11 is a schematic structural view of an exemplary structure of a hologram generating unit according to a fourth exemplary embodiment of the present invention.

FIG. 11 is a schematic structural view of an exemplary structure of a hologram generating unit 12 according to a fourth exemplary embodiment of the present invention. Except that a digital holographic apparatus according to the fourth exemplary embodiment includes the hologram generating unit 12 having a different structure in that object light is obtained by irradiating an observation object with light having different wavelengths and different polarization directions, the structure of the digital holographic apparatus according to the fourth exemplary embodiment is the same as the structure of the digital holographic apparatus according to the third exemplary embodiment. Therefore, corresponding structural features are given the same reference numerals, and are not described. Even in the fourth exemplary embodiment, as in the third exemplary embodiment, reflection light reflected by the observation object is a plane wave. Light with which the observation object is irradiated is a plane wave.

The hologram generating unit 12 according to the fourth exemplary embodiment includes a first unit $100C_1$ and a second unit $100C_2$. Except that, in the first unit $100C_1$, a first light source $22C_1$ that projects "light having a first wavelength and being s-polarized light" is disposed in place of the first light source $22_1$ that projects light having the first wavelength, and a polarizing filter 30S that transmits only s-polarized light is inserted between a wavelength filter $30_1$ and a lens $32_1$, the first unit $100C_1$ has the same structural features as the first unit $100B_1$ shown in FIG. 9. Therefore, the same structural features are not described.

Except that, in the second unit $100C_2$, a second light source $22C_2$ that projects "light having a second wavelength and being p-polarized light" is used in place of the second light source $22_2$ that projects light having the second wavelength, and a polarizing filter 30P that transmits only p-polarized light is inserted between a wavelength filter $30_2$ and a lens $32_2$, the second unit $100C_2$ has the same structural features as the second unit $100B_2$ shown in FIG. 9. Therefore, the same structural features are not described.

In the fourth exemplary embodiment, as in the first exemplary embodiment, a first observation direction and a second observation region intersect each other, and an optical axis of object light having the first wavelength and an optical axis of object light having the second wavelength also intersect each other. In the fourth exemplary embodiment, as in the first exemplary embodiment, the first unit $100C_1$ and the second unit $100C_2$ are disposed such that a focal position of a lens $26_2$ differs from a focal position of a lens $26_1$.

Operation of Hologram Generating Unit

Except that the "light having the first wavelength and being s-polarized light" is used in place of the light having the first wavelength, and the "light having the second wavelength and being p-polarized light" is used in place of the light having the second wavelength, the operation of the hologram generating unit according to the fourth exemplary embodiment is substantially the same as the operation of the hologram generating unit according to the third exemplary embodiment. Therefore, only differences are described.

In the first unit $100C_1$, object light that has the first wavelength and is s-polarized light, and that is incident upon a dividing optical element $28_1$ is transmitted through a reflecting surface $29_1$, and exits therefrom in the first observation direction. Then, the wavelength filter $30_1$ removes light having wavelengths other than the first wavelength, and the polarizing filter 30S removes light other than the s-polarized light. Then, the lens $32_1$ gathers the light, and an image capturing surface of a first image capturing unit $14_1$ is irradiated with the gathered light.

On the other hand, reference light that has the first wavelength and that is s-polarized light, and that is incident upon the dividing optical element $28_1$ is reflected by the reflecting surface $29_1$ in the first observation direction. Then, the wavelength filter $30_1$ removes light having wavelengths other than the first wavelength, and the polarizing filter 30S removes light other than the s-polarized light. Then, the lens $32_1$ collimates the light, and the image capturing surface of the first image capturing unit $14_1$ is irradiated with the collimated light.

The object light that has the first wavelength and that is s-polarized light, and that is incident upon the image capturing surface of the first image capturing unit $14_1$ and the reference light that has the first wavelength and that is s-polarized light, and that is incident upon the image capturing surface of the first image capturing unit $14_1$ interfere with each other to generate an interference fringe at the image capturing surface of the first image capturing unit $14_1$. The first image capturing unit $14_1$ captures, as a first hologram, the interference fringe generated at the image capturing surface.

Next, in the second unit $100C_2$, object light that has the second wavelength and that is p-polarized light, and that is incident upon a dividing optical element $28_2$ is transmitted through a reflecting surface $29_2$ and exits therefrom in the second observation direction. Then, the wavelength filter $30_2$ removes light having wavelengths other than the second wavelength, and the polarizing filter 30P removes light other than the p-polarized light. The lens $32_2$ gathers the light, and an image capturing surface of a second image capturing unit $14_2$ is irradiated with the gathered light.

On the other hand, reference light that has the second wavelength and that is p-polarized light, and that is incident upon the dividing optical element $28_2$ is reflected by a reflecting surface (not shown) in the second observation direction. The wavelength filter $30_2$ removes light having wavelengths other than the second wavelength, and the polarizing filter 30P removes light other than the p-polarized light. The lens $32_2$ collimates the light, and the image capturing surface of the second image capturing unit $14_2$ is irradiated with the collimated light.

The object light that has the second wavelength and that is p-polarized light, and that is incident upon the second image capturing unit $14_2$ and the reference light that has the second wavelength and that is p-polarized light, and that is incident upon the second image capturing unit $14_2$ interfere with each other to generate an interference fringe at the image capturing surface of the second image capturing unit $14_2$. The second image capturing unit $14_2$ captures, as a second hologram, the interference fringe generated at the image capturing surface.

In the fourth exemplary embodiment, as in the first exemplary embodiment, the operation of the first unit $100C_1$ as a first hologram generating unit and the operation of the second unit $100C_2$ as a second hologram generating unit are performed at the same time. As a result, a region including observation regions that are observable at the same time is enlarged. In the fourth exemplary embodiment, as in the first exemplary embodiment, since the object light illuminates the observation object as a plane wave, a wide range of the observation object is uniformly irradiated. Therefore, the brightness of reconstructed images also becomes uniform.

In particular, in the fourth exemplary embodiment, as in the third exemplary embodiment, since the reflection light reflected by the observation object is defined as the object light, a bright image (for example, having a high SN ratio) is obtained compared to the case in which the transmission light is defined as the object light.

In particular, in the fourth exemplary embodiment, as in the second exemplary embodiment, the light having the first wavelength and the light having the second wavelength not only have different wavelengths but also have different polarization directions. Therefore, by allowing the light to be transmitted through the polarizing filters in addition to through the wavelength filters, noise that is not capable of being completely removed by the wavelength filters is removed.

Fifth Exemplary Embodiment

Figure 12:
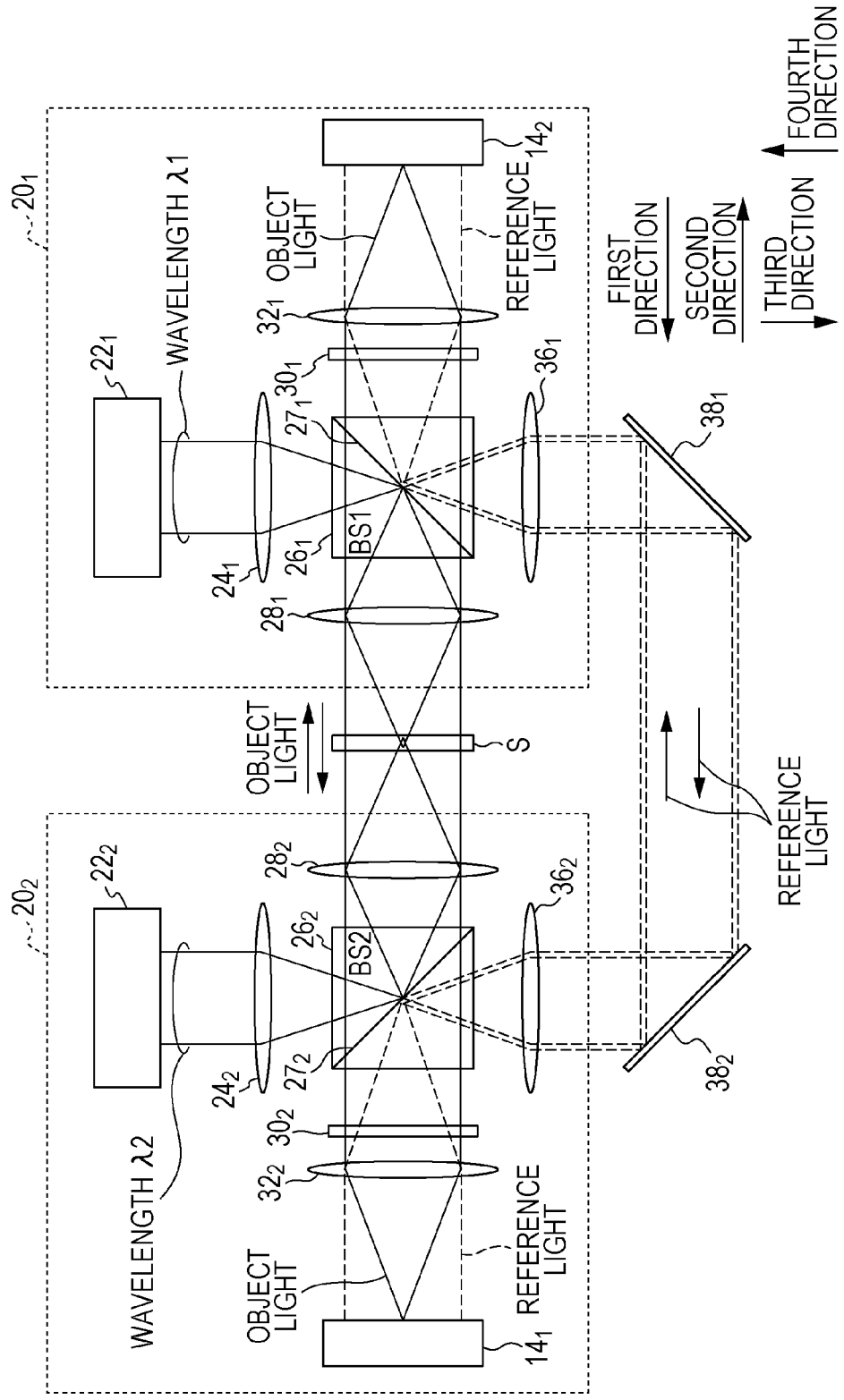
FIG. 12 is a schematic structural view of an exemplary structure of a hologram generating unit according to a fifth exemplary embodiment of the present invention.

FIG. 12 is a schematic structural view of an exemplary structure of a hologram generating unit 12 according to a fifth exemplary embodiment of the present invention. In the fifth exemplary embodiment, transmission light transmitted through an observation object S is defined as object light. The hologram generating unit 12 includes a first unit $20_1$ and a second unit $20_2$, and a pair of reflecting mirrors $38_1$ and $38_2$. The pair of reflecting mirrors $38_1$ and $38_2$ are examples of reflecting sections.

The first unit $20_1$ includes a first light source $22_1$ that projects light having a first wavelength (λ1); a lens $24_1$; a first dividing optical element $26_1$ having a reflecting surface $27_1$ that divides, combines, transmits, or reflects incident light in accordance with an incidence direction; a lens $28_1$; a wavelength filter $30_1$ that transmits only light having a second wavelength (λ2); a lens $32_1$; a second image capturing unit $14_2$; and a lens $36_1$. The optical components are disposed on the same substrate. By disposing the second image capturing unit $14_2$ (on an optical axis of the object light described below) in the first unit $20_1$, the size of the entire digital holographic apparatus 10 is reduced.

The second unit $20_2$ includes a second light source $22_2$ that projects light having a second wavelength (λ2); a lens $24_2$; a second dividing optical element $26_2$ having a reflecting surface $27_2$ that divides, combines, transmits, or reflects incident light in accordance with an incidence direction; a lens $28_2$; a wavelength filter $30_2$ that transmits only light having the first wavelength (λ1); a lens $32_2$; a first image capturing unit $14_1$; and a lens $36_2$. The optical components are disposed on the same substrate. By disposing the first image capturing unit $14_1$ (on an optical axis of the object light described below) in the second unit $20_2$, the size of the entire digital holographic apparatus 10 is reduced.

As the first dividing optical element $26_1$ and the second dividing optical element $26_2$, a beam splitter or the like may be used. As the wavelength filter $30_1$ and the wavelength filter $30_2$, a bandpass filter or the like may be used.

In the first unit $20_1$, other optical components are disposed in all directions with respect to the first dividing optical element $26_1$. The lens $28_1$ is disposed in a first direction with respect to the first dividing optical element $26_1$. The wavelength filter $30_1$, the lens $32_1$, and the second image capturing unit $14_2$ are disposed in a second direction with respect to the first dividing optical element $26_1$. The lens $36_1$ is disposed in a third direction with respect to the first dividing optical element $26_1$. The first light source $22_1$ and the lens $24_1$ are disposed in a fourth direction with respect to the first dividing optical element $26_1$. The fourth direction is a counter direction with respect to the third direction.

The lens $28_1$, the first dividing optical element $26_1$, the wavelength filter $30_1$, and the lens $32_1$ are disposed in that order along the second direction with their optical axes coinciding with each other. As described below, the optical axes of these optical systems are equivalent to an optical axis of object light having the second wavelength. The second image capturing unit $14_2$ is disposed in the second direction with respect to the lens $32_1$ such that its image surface intersects the optical axes of the optical systems (the optical axis of the object light having the second wavelength). The second image capturing unit $14_2$ is disposed at a focal position of the lens $32_1$.

The first light source $22_1$, the lens $24_1$, the first dividing optical element $26_1$, and the lens $36_1$ are disposed in that order along the third direction with their optical axes coinciding with each other. The reflecting mirror $38_1$ is disposed so as to intersect the optical axes of these optical systems. In the illustrated example, the reflecting mirror $38_1$ includes a reflecting surface that is inclined at an angle of 45 degrees with respect to the optical axes of the optical systems such that incident light is reflected in the direction of the reflecting mirror $38_2$.

In the second unit $20_2$, other optical components are disposed in all directions with respect to the second dividing optical element $26_2$. The lens $28_2$ is disposed in the second direction with respect to the second dividing optical element $26_2$. The wavelength filter $30_2$, the lens $32_2$, and the first image capturing unit $14_1$ are disposed in the first direction with respect to the second dividing optical element $26_2$. The lens $36_2$ is disposed in the third direction with respect to the second dividing optical element $26_2$. The second light source $22_2$ and the lens $24_2$ are disposed in the fourth direction with respect to the second dividing optical element $26_2$.

The lens $28_2$, the second dividing optical element $26_2$, the wavelength filter $30_2$, and the lens $32_2$ are disposed in that order along the first direction with their optical axes coinciding with each other. As described below, the optical axes of these optical systems are equivalent to an optical axis of object light having the first wavelength. The first image capturing unit $14_1$ is disposed in the first direction with respect to the lens $32_2$ such that its image surface intersects the optical axes of the optical systems (the optical axis of the object light having the first wavelength). The first image capturing unit $14_1$ is disposed at a focal position of the lens $32_2$.

The second light source $22_2$, the lens $24_2$, the second dividing optical element $26_2$, and the lens $36_2$ are disposed in that order along the third direction with their optical axes coinciding with each other. The reflecting mirror $38_2$ is disposed so as to intersect the optical axes of these optical systems. In the illustrated example, the reflecting mirror $38_2$ includes a reflecting surface that is inclined at an angle of 45 degrees with respect to the optical axes of the optical systems such that incident light is reflected in the direction of the reflecting mirror $38_1$.

In the fifth exemplary embodiment, the optical axis of the object light having the first wavelength and the optical axis of the object light having the second wavelength are coaxial. Therefore, when these axes need not be distinguished, these axes are generally called "the optical axis of the object light". That is, the lens $28_1$, the first dividing optical element $26_1$, the wavelength filter $30_1$, and the lens $32_1$ of the first unit $20_1$, and the lens $28_2$, the second dividing optical element $26_2$, the wavelength filter $30_2$, and the lens $32_2$ of the second unit $20_2$ are each disposed along the optical axis of the object light.

In the fifth exemplary embodiment, the first unit $20_1$ and the reflecting mirror $38_1$, and the second unit $20_2$ and the reflecting mirror $38_2$ are symmetrically disposed with respect to a plane including the position of an observation object S and being perpendicular to the optical axis of the object light. In the description below, this plane is referred to as a "reference plane including the position of the observation object". The observation object S is held by a holding member (not shown). The first unit $20_1$ and the second unit $20_2$ are disposed such that a focal position of the lens $28_1$ and a focal position of the lens $28_2$ are disposed within the observation object S. As described below, the focal position of the lens $28_2$ differs from the focal position of the lens $28_1$.

Although the lens $24_1$, the lens $28_1$, the lens $36_2$, and the lens $32_2$ form a 4f optical system with respect to light having the first wavelength, the lens $28_2$ and the lens $32_2$ may form an infinity correction optical system with respect to the light having the first wavelength. Similarly, although the lens $24_2$, the lens $28_2$, the lens $36_1$, and the lens $32_1$ form a 4f optical system with respect to the light having the second wavelength, the lens $28_1$ and the lens $32_1$ may form an infinity correction optical system with respect to the light having the second wavelength. Although, in each 4f optical system, the focal lengths of the lenses are equal to each other, the focal lengths of the lenses in each infinity correction optical system may differ from each other.

Operation of Hologram Generating Unit

Figure 13B:
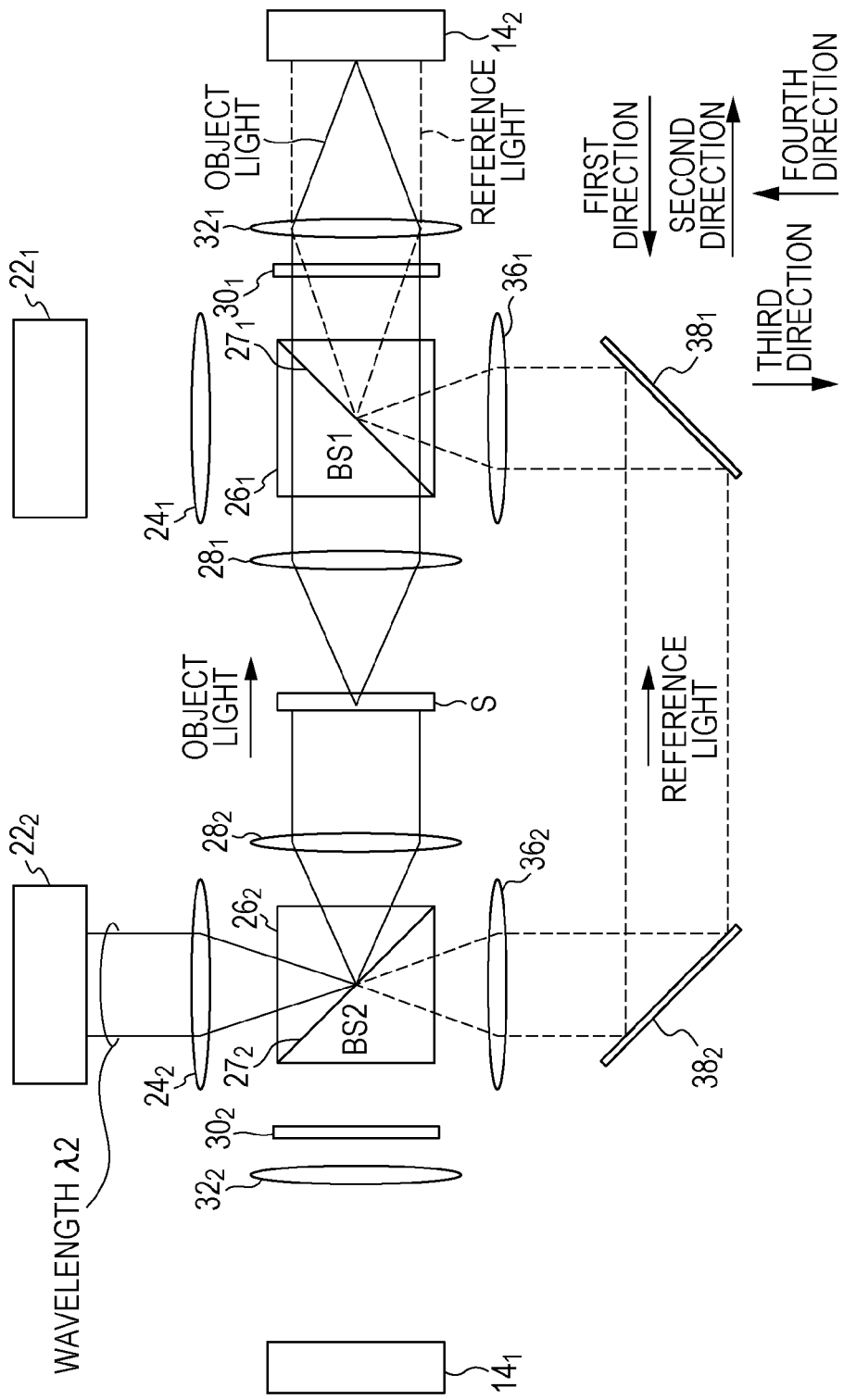

Next, an operation of the hologram generating unit 12 is described. FIGS. 13A and 13B are each a schematic view of an exemplary operation of the hologram generating unit according to the fifth exemplary embodiment. With reference to FIG. 13A, an operation of the hologram generating unit 12 as a first hologram generating unit that generates a first hologram by causing the object light having the first wavelength and reference light having the first wavelength to interfere with each other is described. With reference to FIG. 13B, an operation of the hologram generating unit 12 as a second hologram generating unit that generates a second hologram by causing the object light having the second wavelength and reference light having the second wavelength to interfere with each other is described.

The operation of the hologram generating unit 12 as the first hologram generating unit is described. As shown in FIG. 13A, light having the first wavelength and projected as parallel light from the first light source $22_1$ is gathered by the lens $24_1$ and is incident upon the first dividing optical element $26_1$.

The light having the first wavelength and incident upon the first dividing optical element $26_1$ is such that a part thereof is reflected by the reflecting surface $27_1$ in the first direction. In addition, the light having the first wavelength and incident upon the first dividing optical element $26_1$ is such that a remaining part thereof is transmitted through the reflecting surface $27_1$ and exits therefrom in the third direction. This causes the light having the first wavelength and projected from the first light source $22_1$ to be divided into object light and reference light. The reference light is indicated by dotted lines.

The light (object light) having the first wavelength and reflected by the first dividing optical element $26_1$ in the first direction is collimated by the lens $28_1$, and illuminates the observation object S. The light having the first wavelength and illuminating the observation object S is a "plane wave". The light that illuminates the observation object S is scattered when it is transmitted through the observation object S. FIG. 13A illustrates a state in which the light that passes the optical axis is scattered.

The object light having the first wavelength and transmitted through the observation object S is collimated by the lens $28_2$, and is incident upon the second dividing optical element $26_2$. The object light having the first wavelength and incident upon the second dividing optical element $26_2$ is transmitted through the reflecting surface $27_2$ and exits therefrom in the first direction. The wavelength filter $30_2$ removes light having wavelengths other than the first wavelength, and the lens $32_2$ gathers the light to irradiate an image capturing surface of the first image capturing unit $14_1$ with the gathered light.

The light (reference light) having the first wavelength and exiting from the first dividing optical element $26_1$ in the third direction is collimated by the lens $36_1$, and illuminates the reflecting mirror $38_1$. The collimated reference light having the first wavelength is reflected by the reflecting mirror $38_1$ in the direction of the reflecting mirror $38_2$, is reflected by the reflecting mirror $38_2$ in the direction of the lens $36_2$, is gathered by the lens $36_2$, and is incident upon the second dividing optical element $26_2$.

The reference light having the first wavelength and incident upon the dividing optical element $26_2$ is reflected by the reflecting surface $27_2$ in the first direction. The wavelength filter $30_2$ removes light having wavelengths other than the first wavelength, and the lens $32_2$ collimates the light to irradiate the image capturing surface of the first image capturing unit $14_1$ with the collimated light.

The object light having the first wavelength and illuminating the image capturing surface of the first image capturing unit $14_1$ and the reference light having the first wavelength and illuminating the image capturing surface of the first image capturing unit $14_1$ interfere with each other to generate an interference fringe at the image capturing surface of the first image capturing unit $14_1$. The first image capturing unit $14_1$ captures, as the first hologram, the interference fringe generated at the image capturing surface.

Next, the operation of the hologram generating unit as the second hologram generating unit is described. As shown in FIG. 13B, light having the second wavelength and projected as parallel light from the second light source $22_2$ is gathered by the lens $24_2$, and is incident upon the second dividing optical element $26_2$.

The light having the second wavelength and incident upon the second dividing optical element $26_2$ is such that a part thereof is reflected by the reflecting surface $27_2$ in the second direction. In addition, the light having the second wavelength and incident upon the second dividing optical element $26_2$ is such that a remaining part thereof is transmitted through the reflecting surface $27_2$, and exits therefrom in the third direction. This causes the light having the second wavelength and projected from the second light source $22_2$ to be divided into object light and reference light. The reference light is indicated by dotted lines.

The light (object light) having the second wavelength and reflected by the second dividing optical element $26_2$ in the second direction is collimated by the lens $28_2$, and illuminates the observation object S. That is, the light having the second wavelength and illuminating the observation object S is a "plane wave". The light that illuminates the observation object S is scattered when it is transmitted through the observation object S. FIG. 13B illustrates a state in which the light that passes the optical axis is scattered.

The object light having the second wavelength and transmitted through the observation object S is collimated by the lens $28_1$, and is incident upon the dividing optical element $26_1$. The object light having the second wavelength and incident upon the first dividing optical element $26_1$ is transmitted through the reflecting surface $27_1$ and exits therefrom in the second direction. The wavelength filter $30_1$ removes light having wavelengths other than the second wavelength, and the lens $32_1$ gathers the light to irradiate an image capturing surface of the second image capturing unit $14_2$ with the gathered light.

The light (reference light) having the second wavelength and exiting from the second dividing optical element $26_2$ in the third direction is collimated by the lens $36_2$, and illuminates the reflecting mirror $38_2$. The collimated reference light having the second wavelength is reflected by the reflecting mirror $38_2$ in the direction of the reflecting mirror $38_1$, and is reflected by the reflecting mirror $38_1$ in the direction of the lens $36_1$. The lens $36_1$ gathers the light, and the gathered light is incident upon the first dividing optical element $26_1$.

The reference light having the second wavelength and incident upon the first dividing optical element $26_1$ is reflected by the reflecting surface $27_1$ in the second direction. The wavelength filter $30_1$ removes light having wavelengths other than the second wavelength, and the lens $32_1$ collimates the light to irradiate the image capturing surface of the second image capturing unit $14_2$ with the collimated light.

The object light having the second wavelength and illuminating the image capturing surface of the second image capturing unit $14_2$ and the reference light having the second wavelength and illuminating the image capturing surface of the second image capturing unit $14_2$ interfere with each other to generate an interference fringe at the image capturing surface of the second image capturing unit $14_2$. The second image capturing unit $14_1$ captures, as the second hologram, the interference fringe generated at the image capturing surface.

In the fifth exemplary embodiment, the optical axis of the object light having the first wavelength and the optical axis of the object light having the second wavelength are coaxial. By disposing the optical components symmetrically with respect to the reference plane including the position of the observation object, the optical components and optical paths are made common, so that the operation of the hologram generating unit 12 as the first hologram generating unit and the operation of the hologram generating unit 12 as the second hologram generating unit are performed at the same time. This enlarges a region including observation regions that are observed at the same time.

Since the wavelength of the light having the first wavelength and the wavelength of the light having the second wavelength differ from each other, it is possible to irradiate the observation object with the light having the first wavelength and the light having the second wavelength to generate the object light having the first wavelength and the object light having the second wavelength. The generated object light having the first wavelength and the generated object light having the second wavelength are separated by, for example, the wavelength filter.

In the fifth exemplary embodiment, since the object light illuminates the observation object as a plane wave, a wide range of the observation object is uniformly irradiated. Therefore, the brightness of reconstructed images also becomes uniform. For example, when the inside of a plane of the observation object or a wide range in a depth direction of the observation object is to be photographed, a method of irradiating the observation object with the object light as a plane wave is a suitable method.

In the fifth exemplary embodiment, the optical axis of the object light and the optical axis of the reference light having the same wavelength are coaxial with respect to each other (in-line relationship). However, the optical axis of the reference light may be inclined such that the optical axis of the object light and the optical axis of the reference light intersect each other (off-axis relationship). The off-axis relationship makes it easier for first-order diffracted light and zeroth order diffracted light to be separated, and allows noise that is generated at the reconstructed images by the zeroth order diffracted light to be reduced.

For example, in order to obliquely irradiate the observation object with the reference light having the first wavelength, the second dividing optical element $26_2$ only needs to be inclined. Alternatively, a deflecting element that changes the optical path of the reference light only needs to be inserted in front of or in back of the wavelength filter $30_2$. The deflecting element may be, for example, an optical element such as a wedge type prism.

Enlargement of Region that is Observed

Next, the enlargement of a region that is observed is described.

Figure 14A:
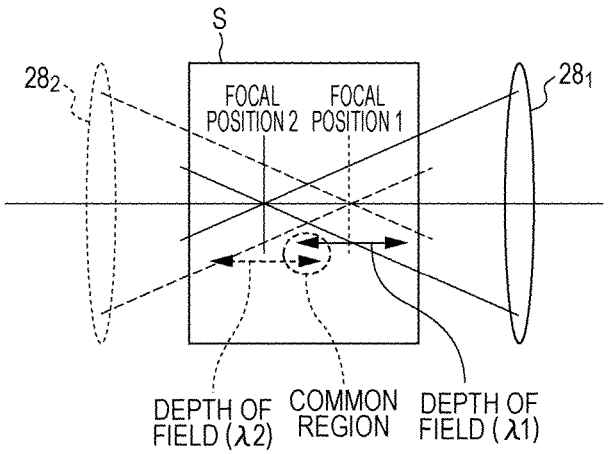
FIG. 14A is a schematic view of a region through which light beams having different wavelengths are transmitted.
Figure 14B:
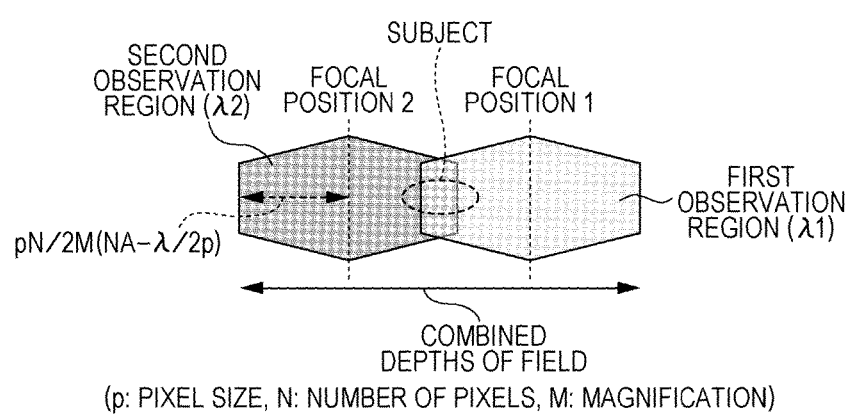
FIG. 14B is a schematic view of observation regions based on the light beams having different wavelengths.

FIG. 14A is a schematic view of a region through which light beams having different wavelengths are transmitted. FIG. 14B is a schematic view of observation regions based on the light beams having different wavelengths. As mentioned in describing the operation of the hologram generating unit as the first hologram generating unit, the object light having the first wavelength and transmitted through the observation object S is collimated by the lens $28_2$. In addition, as mentioned in describing the operation of the hologram generating unit as the second hologram generating unit, the object light having the second wavelength and transmitted through the observation object S is collimated by the lens $28_1$.

Therefore, as shown in FIG. 14A, the object light having the first wavelength is focused at a focal position 1 of the lens $28_2$ in the observation object S; and the object light having the second wavelength is focused at a focal position 2 of the lens $28_1$ in the observation object S. The focal position 1 in the direction of the optical axis of the object light and the focal position 2 in the direction of the optical axis of the object light differ from each other. As described above, in the fifth exemplary embodiment, the second unit $100_2$ including the lens $28_2$ is moved relative to the first unit $100_1$ including the lens $28_1$ along the optical axis of the object light to separate the focal position 1 and the focal position 2 from each other.

FIG. 14A schematically shows a region in the observation object S through which the object light beams are transmitted, and shows a maximum angular range of light beams that are incident upon objective lenses among scattered light beams from the focal positions on the respective optical axes.

Here, the term "focal depth" refers to the "distance from where a focal position is located on an image capturing element in the direction of the optical axis" at which blurring of an optical image formed when the object light is focused is permitted. In addition, the term "depth of field" refers to the "distance from where a focal position in the observation object in the direction of the optical axis (that is, the distance of reconstruction from a hologram" at which blurring of an optical image formed when the object light is focused is permitted.

That is, the range that is indicated by a thick solid double-headed arrow and that extends between a location in front of and a location in back of the focal position 1 in the direction of the optical axis corresponds to a depth of field (λ1) based on the object light having the first wavelength. In addition, the range that is indicated by a thick dotted-line double-headed arrow and that extends between a location in front of and a location in back of the focal position 2 corresponds to a depth of field (λ2) based on the object light having the second wavelength.

As shown in FIG. 14B, as seen in cross section including the optical axes of the object light beams, a first observation region (λ1) that is shown using a light color and that is based on the object light having the first wavelength has a shape formed by joining the bases of two trapezoids (hereunder referred to as a "trapezoidal shape") in accordance with the depth of field (λ1) and the NA of the objective lens. A second observation region (λ2) that is shown using a dark color and that is based on the object light having the second wavelength has a trapezoidal shape in accordance with the depth of field (λ2) and the NA of the objective lens. The observation regions have trapezoidal shapes because the observation regions are restricted by the NA of the objective lenses.

Since the focal position 1 and the focal position 2 are displaced from each other in the direction of the optical axis of the object light, the depth of field (λ1) and the depth of field (λ2) are displaced from each other in the direction of the optical axis, and the first observation region (λ1) and the second observation region (λ2) are also displaced from each other in the direction of the optical axis. Therefore, a depth of field is increased by combining the depth of field (λ1) and the depth of field (λ2) with each other. Consequently, compared to the case in which the observation object is irradiated with light having a single wavelength, a region including observation regions that are observed at the same time is enlarged to a region in which the first observation region (λ1) and the second observation region (λ2) are connected to each other.

When the wavelength is λ, the numerical aperture of the lenses $28_1$ and $28_2$, which are objective lenses, is NA, the diameter of pixels of the image capturing units (that is, the pixel pitch) is p, the number of pixels of the image capturing units is N, and the magnification is M, the depth of field is a range from the focal position and is expressed by the following Formula (1). In Formula (1) below, "N" of the numerator represents the number of pixels:

$$\frac{pN}{2M\left(NA - \frac{\lambda}{2p}\right)} \quad (1)$$

Formula (1) above indicates the range that allows the resolving power that is determined by the NA of the objective lenses to be maintained. Therefore, since the required resolution depends upon use, formulas for the depth of field are not limited to this formula. The image information processing unit 16 connects the first observation region (λ1) and the second observation region (λ2) to each other (see FIG. 1).

The image information processing unit 16 reads out image information about the first hologram and image information about the second hologram that are associated with each other from the storage device, processes the image information about the first hologram to generate a first reconstructed image, and processes the image information about the second hologram to generate a second reconstructed image. By combining the first reconstructed image and the second reconstructed image, the first observation region (λ1) and the second observation region (λ2) are connected to each other. An image in which the observation regions are connected to each other, that is, a composite image of the first reconstructed image and the second reconstructed image is displayed on the display 18.

In associating the image information about the first hologram and the image information about the second hologram with each other and in storing them, the three-dimensional coordinates of the focal position 1 where the object light having the first wavelength is focused and the three-dimensional coordinates of the focal position 2 where the object light having the second wavelength is focused may be stored together. For example, when the holding member that holds the observation object S includes a position sensor or the like, the three-dimensional coordinates of the focal positions of the lenses $28_1$ and $28_2$, which are objective lenses, are determined. The three-dimensional coordinates of the focal position 1 and the three-dimensional coordinates of the focal position 2 are used when combining the first reconstructed image and the second reconstructed image.

In the example shown in FIG. 14B, the depth of field (λ1) and the depth of field (λ2) partly overlap each other (illustrated as a "common region" in FIG. 14A), and the first observation region (λ1) and the second observation region (λ2) also partly overlap each other. The overlap portion is shown in a color that is intermediate between the dark color and the light color. As shown in FIG. 14B, for example, when a subject exists in both observation regions so as to extend in and beyond the overlap region, the overall shape of the subject is obtained by connecting the first observation region (λ1) and the second observation region (λ2).

Here, a mode of enlargement of a region that is observed is described.

(1) Direction of Displacement of Region that is Observed

Figure 15A:
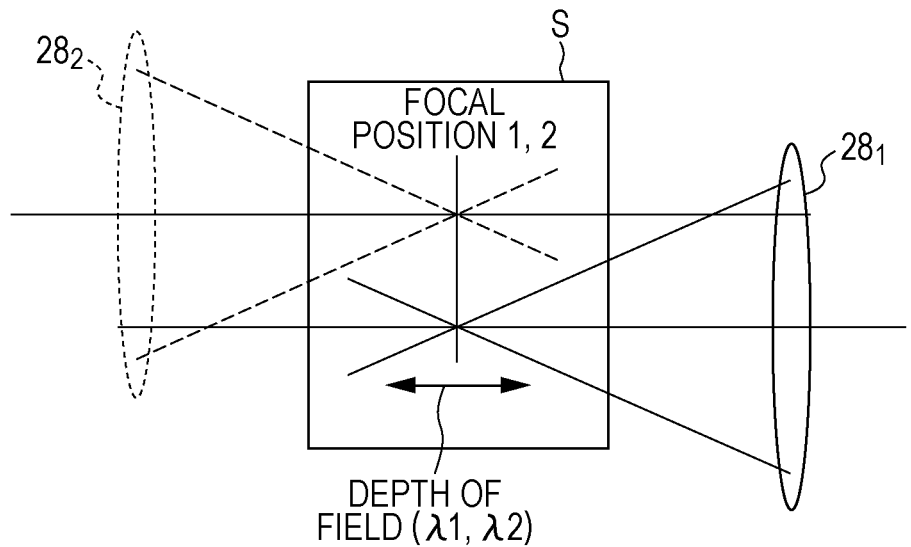
FIG. 15A is a schematic view of a region through which light beams having different wavelengths are transmitted when optical axes are displaced from each other.
Figure 15B:
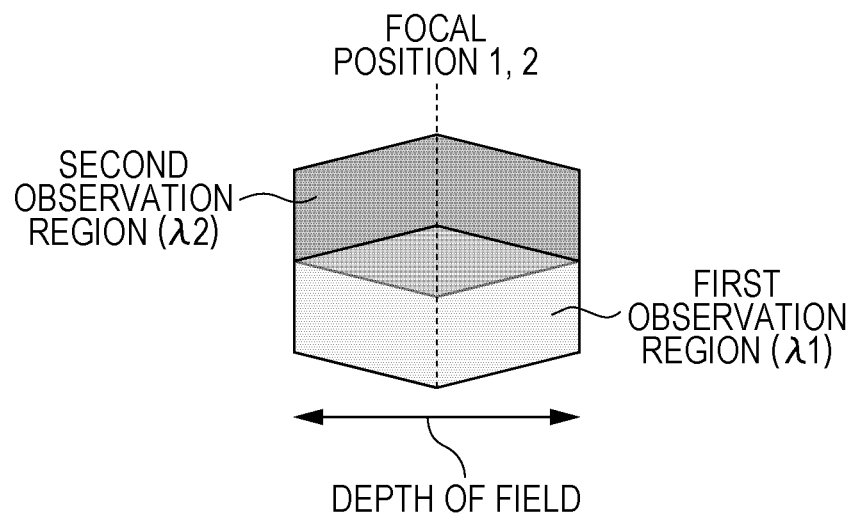
FIG. 15B is a schematic view of observation regions based on the light beams having different wavelengths.

Although FIGS. 14A and 14B illustrate an example in which the two observation regions are displaced from each other in the direction of the optical axis, the region including the observation regions that are observed at the same time is enlarged even by displacing the two observation regions in a direction that intersects the optical axes. FIG. 15A is a schematic view of a region through which light beams having different wavelengths are transmitted. FIG. 15B is a schematic view of observation regions based on the light beams having different wavelengths.

As shown in FIG. 15A, the object light having the first wavelength is focused at the focal position 1 of the lens $28_2$ in the observation object S; and the object light having the second wavelength is focused at the focal position 2 of the lens $28_1$ in the observation object S. The focal position 1 and the focal position 2 correspond with each other in the directions of the optical axes of the respective object light beams. Therefore, the depth of field is not increased. The optical axis of the object light having the first wavelength and the optical axis of the object light having the second wavelength are displaced in a direction that crosses these optical axes (direction orthogonal to the optical axes in FIG. 15A).

Therefore, as shown in FIG. 15B, as seen in cross section including the optical axes of the object light beams, the first observation region ($\lambda 1$) that is shown using a light color and that is based on the object light having the first wavelength is displaced in a direction that intersects the optical axes from the second observation region ($\lambda 2$) that is shown using a dark color and that is based on the object light having the second wavelength. Therefore, compared to the case in which the observation object is irradiated with light having a single wavelength and is observed, a region including observation regions that are observed at the same time is enlarged to a region in which the first observation region ($\lambda 1$) and the second observation region ($\lambda 2$) are connected to each other.

(2) State of Overlap of Region that is Observed

Figure 16A:
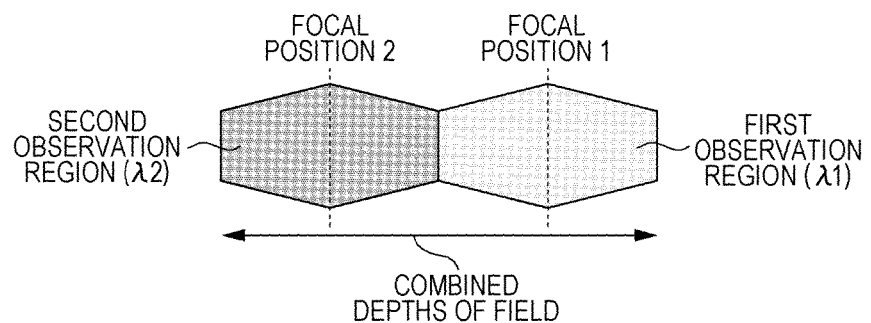
FIGS. 16A to 16C are schematic views showing a state in which a region that is observed is enlarged.
Figure 16B:
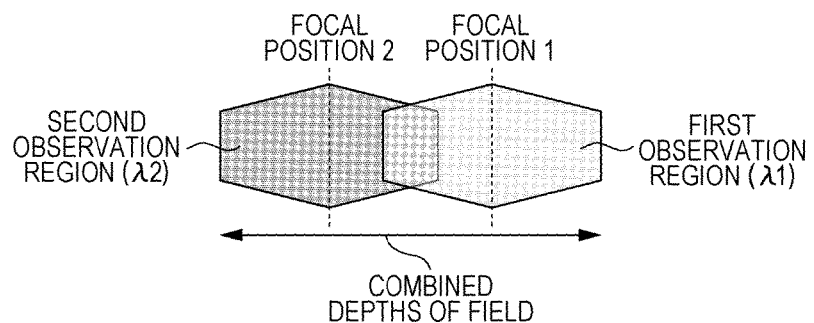
Figure 16C:
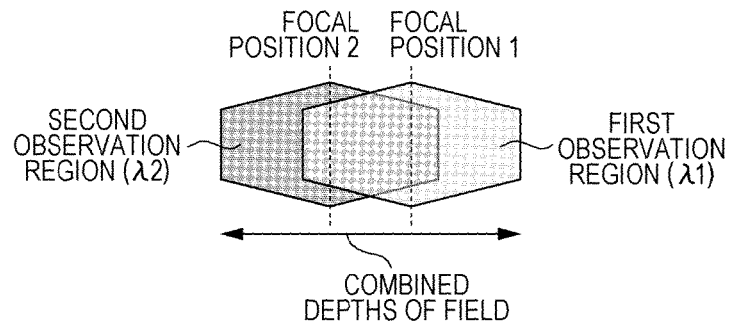

FIGS. 16A to 16C are schematic views showing a state in which a region that is observed is enlarged. Even here, the first observation region ($\lambda 1$) is shown using a light color, and the second observation region ($\lambda 2$) is shown using a dark color. In the example shown in FIGS. 14A and 14B, as in the example shown in FIG. 16B, the first observation region ($\lambda 1$) and the second observation region ($\lambda 2$) partly overlap each other. In this case, since the overlap portion is identified on the basis of, for example, pattern matching, the first observation region ($\lambda 1$) and the second observation region ($\lambda 2$) are easily connected to each other.

The state of overlap of the two observation regions is not limited to that mentioned above. For example, as shown in FIG. 16A, the first observation region ($\lambda 1$) and the second observation region ($\lambda 2$) may adjoin each other. In this case, the combined depths of field is a maximum, and the size of the region including the connected observation regions is also a maximum.

As shown in FIG. 16C, the first observation region ($\lambda 1$) and the second observation region ($\lambda 2$) may overlap each other by a large amount. In this case, as regards the overlap portion, image information about the first hologram and image information about the second hologram are obtained. As regards an observation position that is closer to the focal position 1 than to the focal position 2 in the overlap portion, a reconstructing operation is performed using the image information about the first hologram. As regards an observation position that is closer to the focal position 2 than to the focal position 1, a reconstructing operation is performed using the image information about the second hologram. This suppresses a reduction in the SN ratios. As regards each observation position in the overlap portion, a reconstructing operation may be performed using the average value of the two pieces of image information.

(3) Magnification of Observation Regions

In the example shown in FIGS. 14A and 14B, the case in which the magnifications of the two observation regions are the same is described. However, the magnifications of the two observation regions may differ from each other. Here, the magnification refers to a value obtained by dividing the focal length of a focusing lens by the focal length of the corresponding objective lens. In the case of the light having the first wavelength, the lens $32_2$ is the focusing lens, and the lens $28_2$ is the objective lens. In the case of the light having the second wavelength, the lens $32_1$ is the focusing lens, and the lens $28_1$ is the objective lens.

Figure 17A:
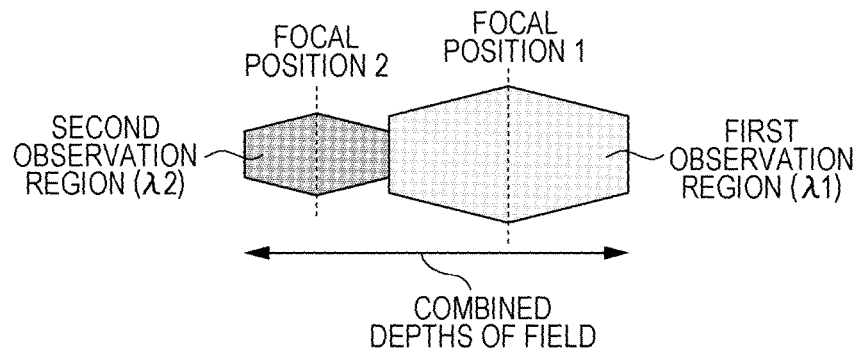
FIGS. 17A to 17C are schematic views each showing observation regions based on light beams having different wavelengths when magnifications with respect to the light beams having different wavelengths differ from each other.
Figure 17B:
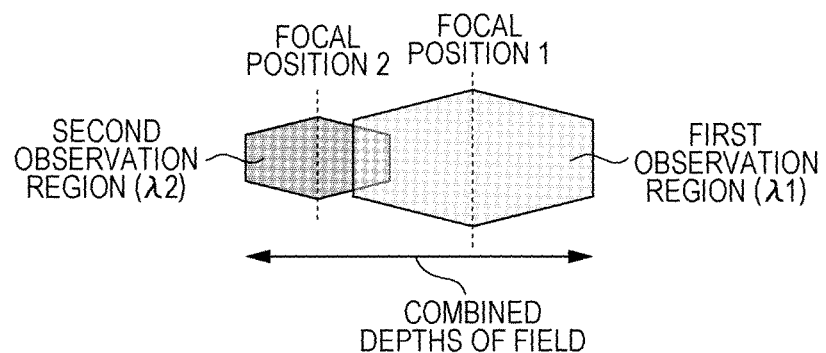
Figure 17C:
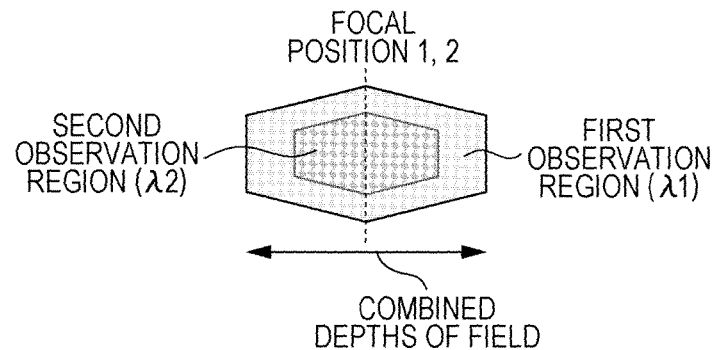

FIGS. 17A to 17C are schematic views each showing observation regions based on the light beams having different wavelengths when magnifications with respect to the light beams having different wavelengths differ from each other. Even in this case, the first observation region ($\lambda 1$) is shown using a light color, and the second observation region ($\lambda 2$) is shown using a dark color. The first observation region ($\lambda 1$) and the second observation region ($\lambda 2$) are connected to each other basically with the same magnification. However, for example, when only the first observation region ($\lambda 1$) is to be enlarged and is observed, as shown in FIGS. 17A to 17C, the magnification with which the first observation region ($\lambda 1$) is observed may be smaller than the magnification with which the second observation region ($\lambda 2$) is observed. By reducing the magnification, the observation region is enlarged.

As shown in FIGS. 16A to 16C, the first observation region ($\lambda 1$) and the second observation region ($\lambda 2$) may adjoin each other (FIG. 17A); the first observation region ($\lambda 1$) and the second observation region ($\lambda 2$) may partly overlap each other (FIG. 17B); and the first observation region ($\lambda 1$) and the second observation region ($\lambda 2$) may overlap each other by a large amount (FIG. 17C). In the example shown in FIG. 17C, the second observation region ($\lambda 2$) is included in the first observation region ($\lambda 1$), and the overlap region is observed with two different magnifications.

Sixth Exemplary Embodiment

Figure 18:
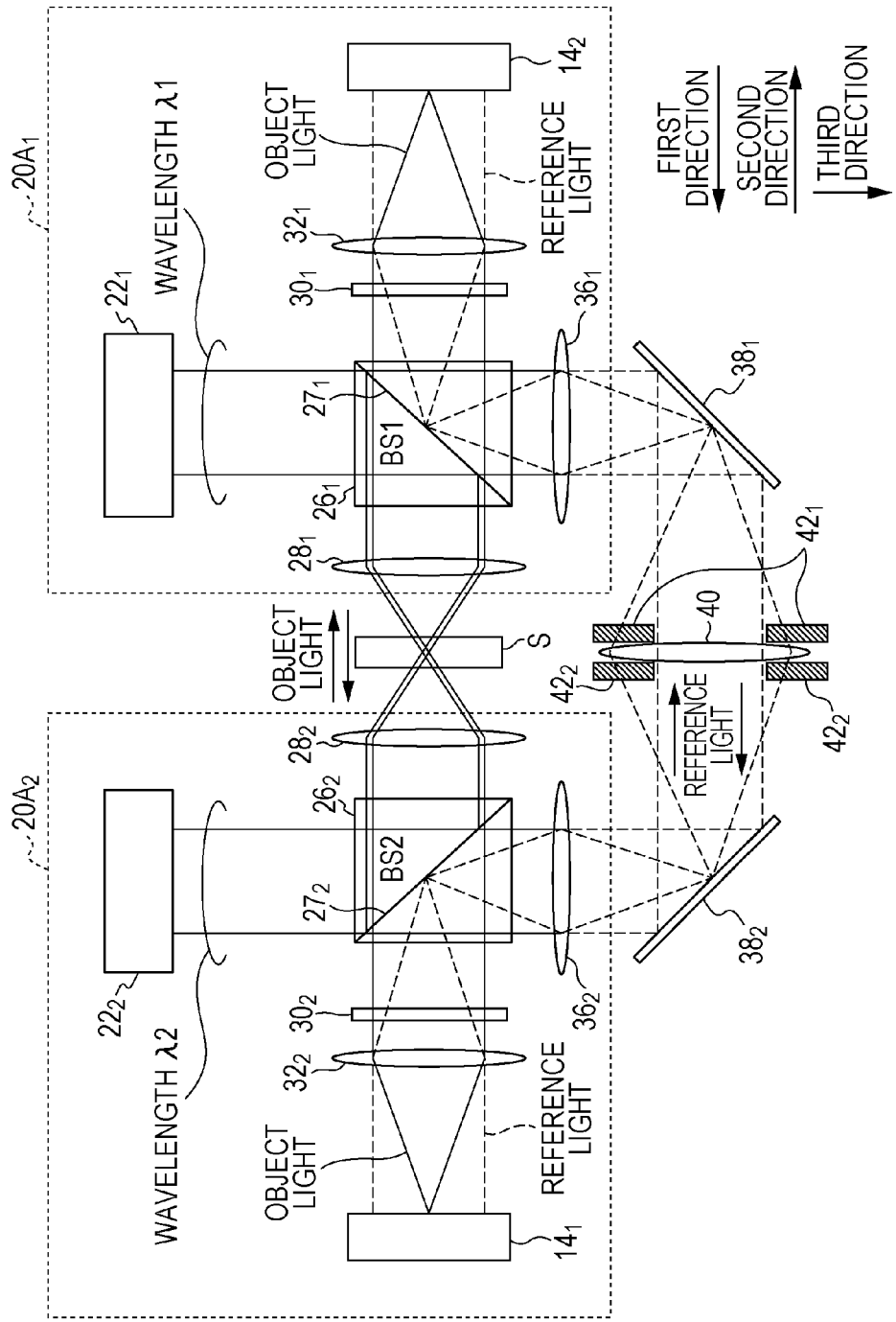
FIG. 18 is a schematic structural view of an exemplary structure of a hologram generating unit according to a sixth exemplary embodiment of the present invention.

FIG. 18 is a schematic structural view of an exemplary structure of a hologram generating unit according to a sixth exemplary embodiment of the present invention. Except that a digital holographic apparatus according to the sixth exemplary embodiment includes the hologram generating unit 12 having a different structure in that object light is obtained by irradiating an observation object with convergent light, the structure of the digital holographic apparatus according to the sixth exemplary embodiment is the same as the structure of the digital holographic apparatus according to the fifth exemplary embodiment. Therefore, corresponding structural features are given the same reference numerals, and are not described. Even in the sixth exemplary embodiment, as in the fifth exemplary embodiment, transmission light transmitted through the observation object is defined as object light.

The hologram generating unit 12 according to the sixth exemplary embodiment includes a lens 40 and a pair of masks $42_1$ and $42_2$, in addition to a first unit $20A_1$, a second unit $20A_2$, and a pair of reflecting mirrors $38_1$ and $38_2$. The first unit $20A_1$ has the same structure as the first unit $20_1$ shown in FIG. 12 except that the first unit $20A_1$ does not include a lens $24_1$.

The second unit $20A_2$ has the same structure as the second unit $20_2$ shown in FIG. 12 except that the second unit $20A_2$ does not include a lens $24_2$. The lens 40, and the pair of masks $42_1$ and $42_2$ are disposed between the reflecting mirror $38_1$ and the reflecting mirror $38_2$. The masks $42_1$ and $42_2$ are disposed on two respective sides of the lens 40 such that the lens 40 is interposed therebetween.

In the sixth exemplary embodiment, the first unit $20A_1$ and the reflecting mirror $38_1$ and the second unit $20A_2$ and the reflecting mirror $38_2$ are symmetrically disposed with respect to a reference plane including the position of an observation object S. The lens 40 is disposed in the reference plane. The masks $42_1$ and $42_2$ are symmetrically disposed with respect to the reference plane including the position of the observation object S.

In the sixth exemplary embodiment, as in the fifth exemplary embodiment, multiple optical components are disposed along an optical axis of object light such that an optical axis of object light having a first wavelength is coaxial with an optical axis of object light having a second wavelength. Further, in the sixth exemplary embodiment, as in the fifth exemplary embodiment, the first unit $20A_1$ and the second unit $20A_2$ are disposed such that a focal position of a lens $28_2$ differs from a focal position of a lens $28_1$.

Operation of Hologram Generating Unit

Figure 19A:
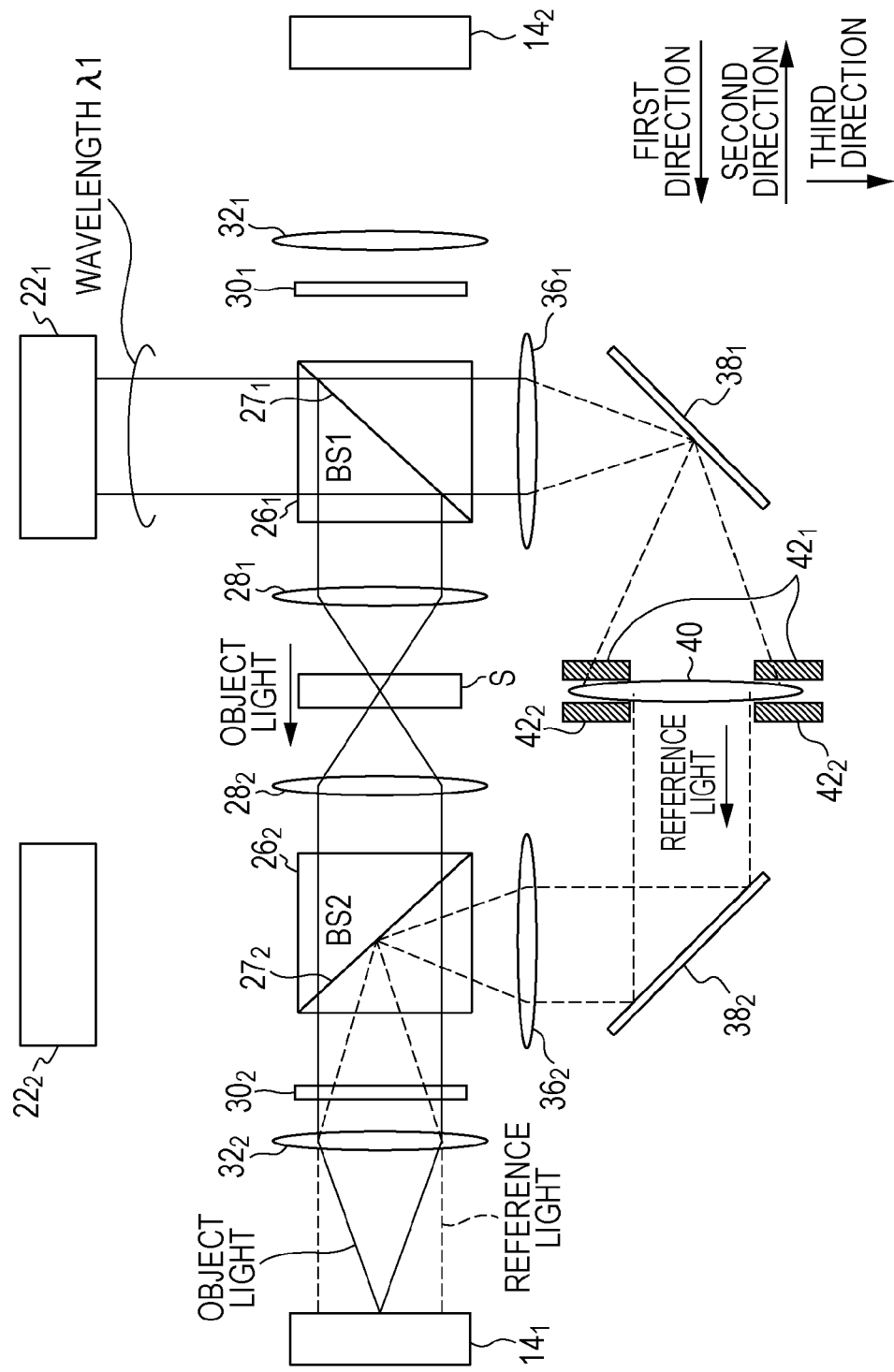
FIGS. 19A and 19B are each a schematic view of an exemplary operation of the hologram generating unit according to the sixth exemplary embodiment.
Figure 19B:
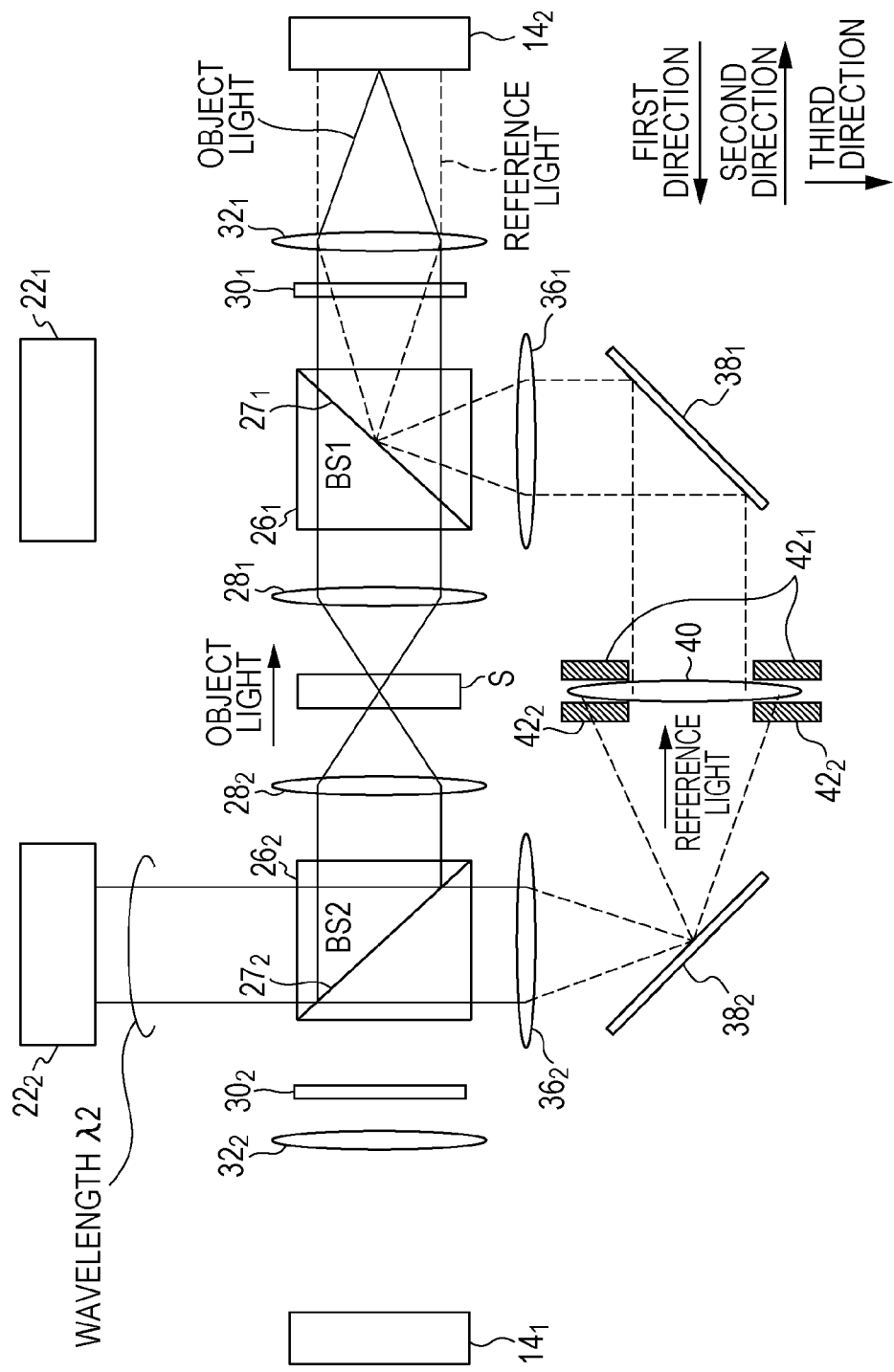

Next, an operation of the hologram generating unit 12 is described. FIGS. 19A and 19B are each a schematic view of an exemplary operation of the hologram generating unit according to the sixth exemplary embodiment. With reference to FIG. 19A, an operation of the hologram generating unit 12 as a first hologram generating unit that generates a first hologram by causing the object light having the first wavelength and reference light having the first wavelength to interfere with each other is described. With reference to FIG. 19B, an operation of the hologram generating unit 12 as a second hologram generating unit that generates a second hologram by causing the object light having the second wavelength and reference light having the second wavelength to interfere with each other is described.

First, the operation of the hologram generating unit as the first hologram generating unit is described. As shown in FIG. 19A, light having the first wavelength and projected as parallel light from a first light source $22_1$ is incident upon a first dividing optical element $26_1$. The light having the first wavelength and incident upon the first dividing optical element $26_1$ is such that a part thereof is reflected in a first direction by a reflecting surface $27_1$. In addition, the light having the first wavelength and incident upon the first dividing optical element $26_1$ is such that a remaining part thereof is transmitted through the reflecting surface $27_1$ and exits therefrom in a third direction. This causes the light having the first wavelength and projected from the first light source $22_1$ to be divided into object light and reference light. The reference light is indicated by dotted lines.

The light (object light) having the first wavelength and reflected in the first direction by the first dividing optical element $26_1$ is gathered by a lens $28_1$ and illuminates an observation object S. That is, the light having the first wavelength and illuminating the observation object S is "convergent light". The light that illuminates the observation object S is scattered when it is transmitted through the observation object S. FIG. 19A illustrates a state in which the light that passes the optical axis is scattered.

The object light having the first wavelength and transmitted through the observation object S is collimated by a lens $28_2$, and is incident upon a second dividing optical element $26_2$. The object light having the first wavelength and incident upon a second dividing optical element $26_2$ is transmitted through a reflecting surface $27_2$ and exits therefrom in the first direction. A wavelength filter $30_2$ removes light having wavelengths other than the first wavelength, and a lens $32_2$ gathers the light to irradiate an image capturing surface of a first image capturing unit $14_1$ with the gathered light.

The light (reference light) having the first wavelength and exiting from the first dividing optical element $26_1$ in the third direction is gathered by a lens $36_1$ and illuminates the reflecting mirror $38_1$. The gathered reference light having the first wavelength is reflected by the reflecting mirror $38_1$ in the direction of the reflecting mirror $38_2$, is formed into a predetermined shape (such as a rectangular shape) by the mask $42_1$, and is collimated by the lens 40. The reference light collimated by the lens 40 is reflected by the reflecting mirror $38_2$ in the direction of a lens $36_2$, is gathered by the lens $36_2$, and is incident upon the second dividing optical element $26_2$.

The reference light having the first wavelength and incident upon the second dividing optical element $26_2$ is reflected by the reflecting surface $27_2$ in the first direction. The wavelength filter $30_2$ removes light having wavelengths other than the first wavelength, and the lens $32_2$ collimates the light to irradiate the image capturing surface of the first image capturing unit $14_1$ with the collimated light. The first image capturing unit $14_1$ captures, as the first hologram, the interference fringe generated at the image capturing surface.

Next, the operation of the hologram generating unit as the second hologram generating unit is described. As shown in FIG. 19B, light having the second wavelength and projected as parallel light from a second light source $22_2$ is incident upon the second dividing optical element $26_2$. The light having the second wavelength and incident upon the second dividing optical element $26_2$ is such that a part thereof is reflected in a second direction by the reflecting surface $27_2$. In addition, the light having the second wavelength and incident upon the second dividing optical element $26_2$ is such that a remaining part thereof is transmitted through the reflecting surface $27_2$ and exits therefrom in the third direction. This causes the light having the second wavelength and projected from the second light source $22_2$ to be divided into object light and reference light. The reference light is indicated by dotted lines.

The light (object light) having the second wavelength and reflected in the second direction by the second dividing optical element $26_2$ is gathered by the lens $28_2$ and illuminates the observation object S. That is, the light having the second wavelength and illuminating the observation object S is "convergent light". The light that illuminates the observation object S is scattered when it is transmitted through the observation object S. FIG. 19B illustrates a state in which the light that passes the optical axis is scattered.

The object light having the second wavelength and transmitted through the observation object S is collimated by the lens $28_1$, and is incident upon the first dividing optical element $26_1$. The object light having the second wavelength and incident upon the first dividing optical element $26_1$ is transmitted through the reflecting surface $27_1$ and exits therefrom in the second direction. The wavelength filter $30_1$ removes light having wavelengths other than the second wavelength, and the lens $32_1$ gathers the light to irradiate an image capturing surface of a second image capturing unit $14_2$ with the gathered light.

The light (reference light) having the second wavelength and exiting from the second dividing optical element $26_2$ in the third direction is gathered by the lens $36_2$ and illuminates the reflecting mirror $38_2$. The gathered reference light having the second wavelength is reflected by the reflecting mirror $38_2$ in the direction of the reflecting mirror $38_1$, is formed into a predetermined shape (such as a rectangular shape) by the mask $42_2$, and is collimated by the lens 40. The reference light collimated by the lens 40 is reflected by the reflecting mirror $38_1$ in the direction of the lens $36_1$, is gathered by the lens $36_1$, and is incident upon the first dividing optical element $26_1$.

The reference light having the second wavelength and incident upon the first dividing optical element $26_1$ is reflected by the reflecting surface $27_1$ in the second direction. The wavelength filter $30_1$ removes light having wavelengths other than the second wavelength, and the lens $32_1$ collimates the light to irradiate the image capturing surface of the second image capturing unit $14_2$ with the collimated light. The object light having the second wavelength and illuminating the image capturing surface of the second image capturing unit $14_2$ and the reference light having the second wavelength and illuminating the image capturing surface of the second image capturing unit $14_2$ interfere with each other to generate an interference fringe at the image capturing surface of the second image capturing unit $14_2$. The second image capturing unit $14_2$ captures, as the second hologram, the interference fringe generated at the image capturing surface.

In the sixth exemplary embodiment, as in the fifth exemplary embodiment, the optical axis of the object light having the first wavelength and the optical axis of the object light having the second wavelength are coaxial. By disposing the optical components symmetrically with respect to the reference plane including the position of the observation object, the optical components and optical paths are made common, so that the operation of the hologram generating unit 12 as the first hologram generating unit and the operation of the hologram generating unit 12 as the second hologram generating unit are performed at the same time. This enlarges a region including observation regions that are observed at the same time compared to the case in which the observation object is irradiated with light having a single wavelength and is observed.

In the sixth exemplary embodiment, the observation object is irradiated with object light that is convergent light. Therefore, compared to the case in which the observation object is irradiated with object light that is a plane wave, a region that is observed is narrow. However, since the light is concentrated in a narrow region, a bright image (for example, having a high SN ratio) is obtained. The method of irradiating the observation object with object light that is convergent light is suitable to, for example, the case in which the observation object is one that considerably absorbs or scatters light.

Seventh Exemplary Embodiment

Figure 20:
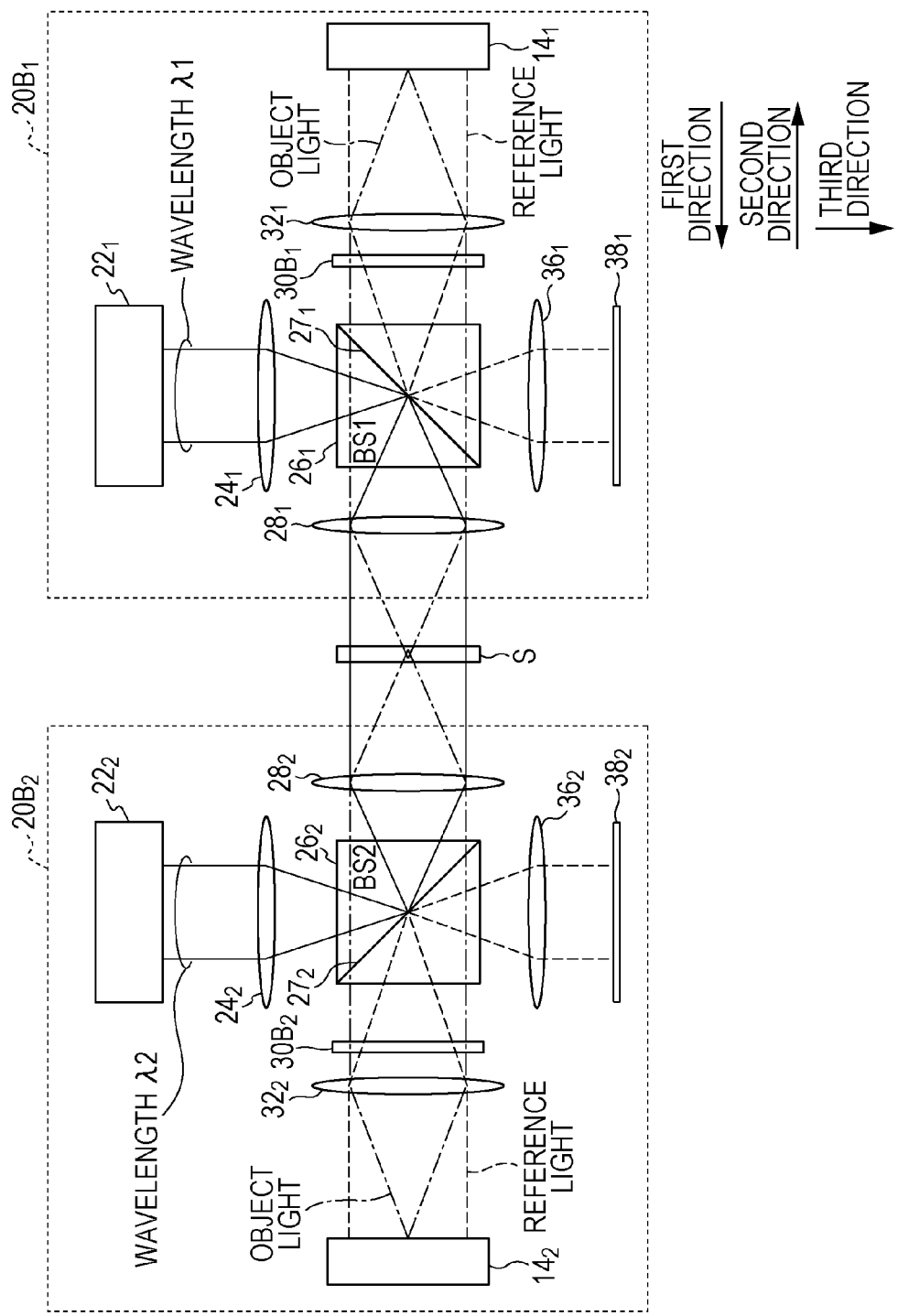
FIG. 20 is a schematic structural view of an exemplary structure of a hologram generating unit according to a seventh exemplary embodiment of the present invention.

FIG. 20 is a schematic structural view of an exemplary structure of a hologram generating unit 12 according to a seventh exemplary embodiment of the present invention. Except that a digital holographic apparatus according to the seventh exemplary embodiment includes the hologram generating unit 12 having a different structure in that reflection light reflected by an observation object is defined as object light, the structure of the digital holographic apparatus according to the seventh exemplary embodiment is the same as the structure of the digital holographic apparatus according to the fifth exemplary embodiment. Therefore, corresponding structural features are given the same reference numerals, and are not described. Even in the seventh exemplary embodiment, as in the fifth exemplary embodiment, light with which the observation light is irradiated is a plane wave.

The hologram generating unit 12 according to the seventh exemplary embodiment includes a first unit $20B_1$ and a second unit $20B_2$. Except that, in the first unit $20B_1$, a wavelength filter $30B_1$ that transmits only light having a first wavelength ($\lambda 1$) is disposed in place of the wavelength filter $30_1$ that transmits only light having the second wavelength ($\lambda 2$), a first image capturing unit $14_1$ is disposed in place of the second image capturing unit $14_2$, and a reflecting mirror $38_1$ is included in the first unit $20B_1$, the first unit $20B_1$ has the same structure as the first unit $20_1$ shown in FIG. 12. Therefore, corresponding structural features are not described.

A first light source $22_1$, a lens $24_1$, a first dividing optical element $26_1$, and a lens $36_1$ are disposed in that order in a third direction with their optical axes coinciding with each other. The reflecting mirror $38_1$ is disposed such that a reflecting surface is orthogonal to optical axes of these optical systems so that incident light is reflected in the direction of the lens $36_1$.

Except that, in the second unit $20B_2$, a wavelength filter $30B_2$ that transmits only light having a second wavelength ($\lambda 2$) is disposed in place of the wavelength filter $30_2$ that transmits only light having the first wavelength ($\lambda 1$), a second image capturing unit $14_2$ is disposed in place of the first image capturing unit $14_1$, and a reflecting mirror $38_2$ is included in the second unit $20B_2$, the second unit $20B_2$ has the same structure as the second unit $20_2$ shown in FIG. 12. Therefore, corresponding structural features are not described.

A second light source $22_2$, a lens $24_2$, a second dividing optical element $26_2$, and a lens $36_2$ are disposed in that order in the third direction with their optical axes coinciding with each other. The reflecting mirror $38_2$ is disposed such that a reflecting surface is orthogonal to optical axes of these optical systems so that incident light is reflected in the direction of the lens $36_2$.

In the seventh exemplary embodiment, the first unit $20B_1$ and the second unit $20B_2$ are symmetrically disposed with respect to a reference plane including the position of an observation object S. In the seventh exemplary embodiment, as in the fifth exemplary embodiment, the optical components are disposed along an optical axis of object light such that an optical axis of object light having the first wavelength is coaxial with an optical axis of object light having the second wavelength. Further, in the seventh exemplary embodiment, the first unit $20B_1$ and the second unit $20B_2$ are disposed such that a focal position of a lens $28_2$ differs from a focal position of a lens $28_1$.

Operation of Hologram Generating Unit

Figure 21A:
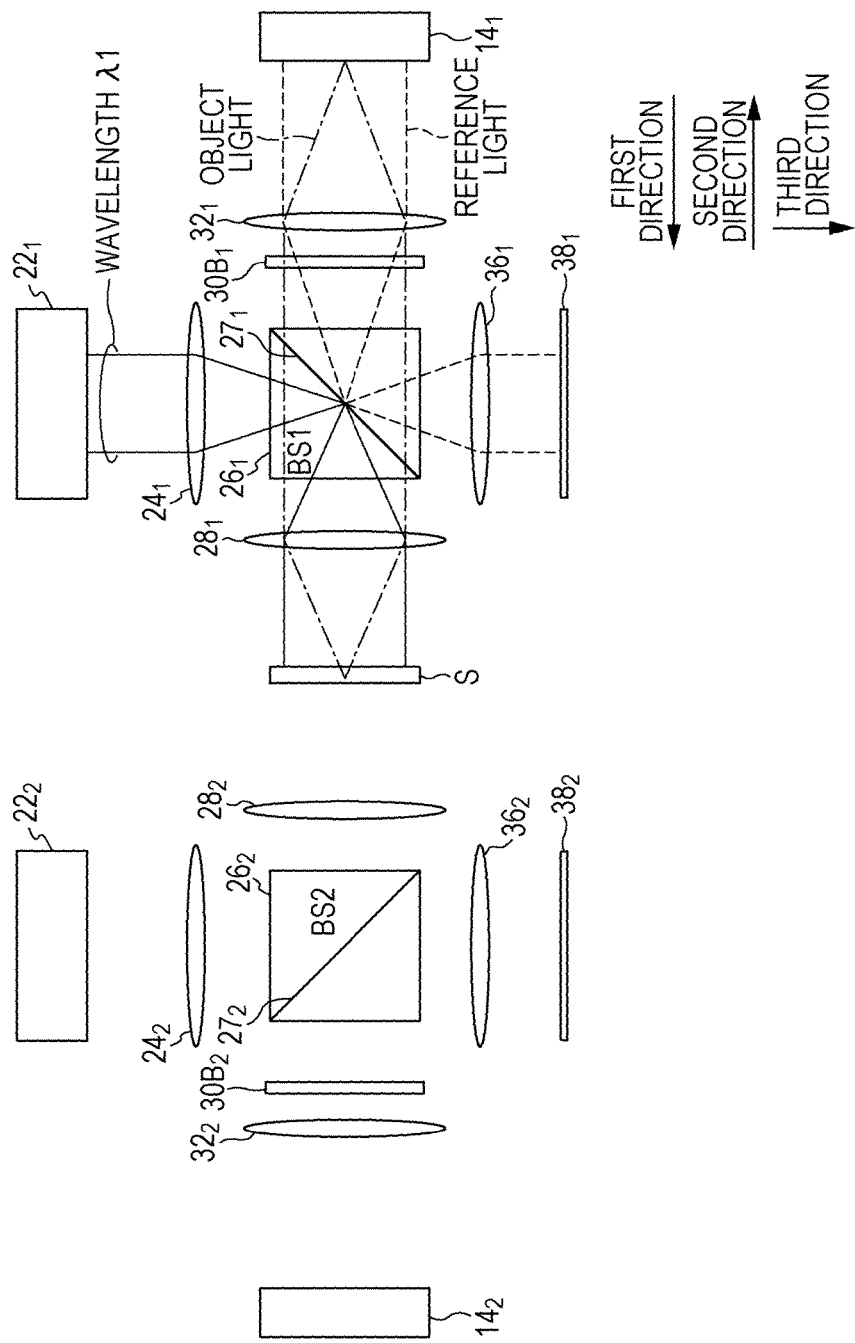

Next, the operation of the hologram generating unit 12 is described. FIGS. 21A and 21B are each a schematic view of an exemplary operation of the hologram generating unit according to the seventh exemplary embodiment. FIG. 21A illustrates the operation of the hologram generating unit as a first hologram generating unit that generates a first hologram by causing the object light having the first wavelength and reference light having the first wavelength to interfere with each other. FIG. 21B illustrates the operation of the hologram generating unit as a second hologram generating unit that generates a second hologram by causing the object light having the second wavelength and reference light having the second wavelength to interfere with each other.

First, the operation of the hologram generating unit as the first hologram generating unit is described. As shown in FIG. 21A, light having the first wavelength and projected as parallel light from the first light source $22_1$ is gathered by the lens $24_1$, and is incident upon the first dividing optical element $26_1$.

The light having the first wavelength and incident upon the first dividing optical element $26_1$ is such that a part thereof is reflected by a reflecting surface $27_1$ in a first direction. In addition, the light having the first wavelength and incident upon the first dividing optical element $26_1$ is such that a remaining part thereof is transmitted through the reflecting surface $27_1$ and exits therefrom in the third direction. This causes the light having the first wavelength and projected from the first light source $22_1$ to be divided into object light and reference light. The reference light is indicated by dotted lines.

The light (object light) having the first wavelength and reflected by the first dividing optical element $26_1$ in the first direction is collimated by the lens $28_1$ and illuminates an observation object S. The light having the first wavelength and illuminating the observation object S is a "plane wave". The light that illuminates the observation object S is scattered when it is reflected by the observation object S. FIG. 21A illustrates a state in which the light that passes the optical axis is scattered.

As indicated by the alternate long and short dash lines, the object light having the first wavelength and reflected by the observation object S is collimated by the lens $28_1$, and is incident upon the first dividing optical element $26_1$. The object light having the first wavelength and incident upon the first dividing optical element $26_1$ is transmitted through the reflecting surface $27_1$ and exits therefrom in a second direction. The wavelength filter $30B_1$ removes light having wavelengths other than the first wavelength, and a lens $32_1$ gathers the light to irradiate an image capturing surface of the first image capturing unit $14_1$ with the gathered light.

The light (reference light) having the first wavelength and exiting from the first dividing optical element $26_1$ in the third direction is collimated by the lens $36_1$, and illuminates the reflecting mirror $38_1$. The collimated reference light having the first wavelength is reflected by the reflecting mirror $38_1$ in the direction of the lens $36_1$, is gathered by the lens $36_1$, and is incident upon the first dividing optical element $26_1$.

The reference light having the first wavelength and incident upon the first dividing optical element $26_1$ is reflected by the reflecting surface $27_1$ in the second direction. The wavelength filter $30B_1$ removes light having wavelengths other than the first wavelength, and the lens $32_1$ collimates the light to irradiate the image capturing surface of the first image capturing unit $14_1$ with the collimated light.

The object light having the first wavelength and illuminating the image capturing surface of the first image capturing unit $14_1$ and the reference light having the first wavelength and illuminating the image capturing surface of the first image capturing unit $14_1$ interfere with each other to generate an interference fringe at the image capturing surface of the first image capturing unit $14_1$. The first image capturing unit $14_1$ captures, as the first hologram, the interference fringe generated at the image capturing surface.

Next, the operation of the hologram generating unit as the second hologram generating unit is described. As shown in FIG. 21B, light having the second wavelength and projected as parallel light from the second light source $22_2$ is gathered by the lens $24_2$, and is incident upon the second dividing optical element $26_2$.

The light having the second wavelength and incident upon the second dividing optical element $26_2$ is such that a part thereof is reflected by a reflecting surface $27_2$ in the second direction. In addition, the light having the second wavelength and incident upon the second dividing optical element $26_2$ is such that a remaining part thereof is transmitted through the reflecting surface $27_2$ and exits therefrom in the third direction. This causes the light having the second wavelength and projected from the second light source $22_2$ to be divided into object light and reference light. The reference light is indicated by dotted lines.

The light (object light) having the second wavelength and reflected by the second dividing optical element $26_2$ in the second direction is collimated by the lens $28_2$ and illuminates the observation object S. That is, the light having the second wavelength and illuminating the observation object S is a "plane wave". The light that illuminates the observation object S is scattered when it is reflected by the observation object S. FIG. 21B illustrates a state in which the light that passes the optical axis is scattered.

As indicated by the alternate long and short dash lines, the object light having the second wavelength and reflected by the observation object S is collimated by the lens $28_2$, and is incident upon the second dividing optical element $26_2$. The object light having the second wavelength and incident upon the second dividing optical element $26_2$ is transmitted through the reflecting surface $27_2$ and exits therefrom in the first direction. A wavelength filter $30B_2$ removes light having wavelengths other than the second wavelength, and a lens $32_2$ gathers the light to irradiate an image capturing surface of a second image capturing unit $14_2$ with the gathered light.

The light (reference light) having the second wavelength and exiting from the second dividing optical element $26_2$ in the third direction is collimated by the lens $36_2$, and illuminates the reflecting mirror $38_2$. The collimated reference light having the second wavelength is reflected by the reflecting mirror $38_2$ in the direction of the lens $36_2$, is gathered by the lens $36_2$, and is incident upon the second dividing optical element $26_2$.

The reference light having the second wavelength and incident upon the second dividing optical element $26_2$ is reflected by the reflecting surface $27_2$ in the first direction. The wavelength filter $30B_2$ removes light having wavelengths other than the second wavelength, and the lens $32_2$ collimates the light to irradiate the image capturing surface of the second image capturing unit $14_2$ with the collimated light.

The object light having the second wavelength and illuminating the image capturing surface of the second image capturing unit $14_2$ and the reference light having the second wavelength and illuminating the image capturing surface of the second image capturing unit $14_2$ interfere with each other to generate an interference fringe at the image capturing surface of the second image capturing unit $14_2$. The second image capturing unit $14_2$ captures, as the second hologram, the interference fringe generated at the image capturing surface.

In the seventh exemplary embodiment, the optical axis of the object light having the first wavelength and the optical axis of the object light having the second wavelength are coaxial. By disposing the optical components symmetrically with respect to the reference plane including the position of the observation object, the operation of the hologram generating unit 12 as the first hologram generating unit and the operation of the hologram generating unit 12 as the second hologram generating unit are performed at the same time. This enlarges a region including observation regions that are observed at the same time compared to the case in which the observation object is irradiated with light having a single wavelength and is observed.

In the seventh exemplary embodiment, since the reflection light reflected by the observation object is defined as the object light, a bright image (for example, having a high SN ratio) is obtained compared to the case in which the transmission light is defined as the object light. This is because, since the object light is generated at the surface of the observation object, the SN ratio of the object light is not reduced by absorption and scattering of the light in the observation object unlike the case in which the transmission light is defined as the object light. Due to the same reason, when the reflection light reflected by the observation object is the object light, the object light need not be "convergent light".

Eighth Exemplary Embodiment

Figure 22:
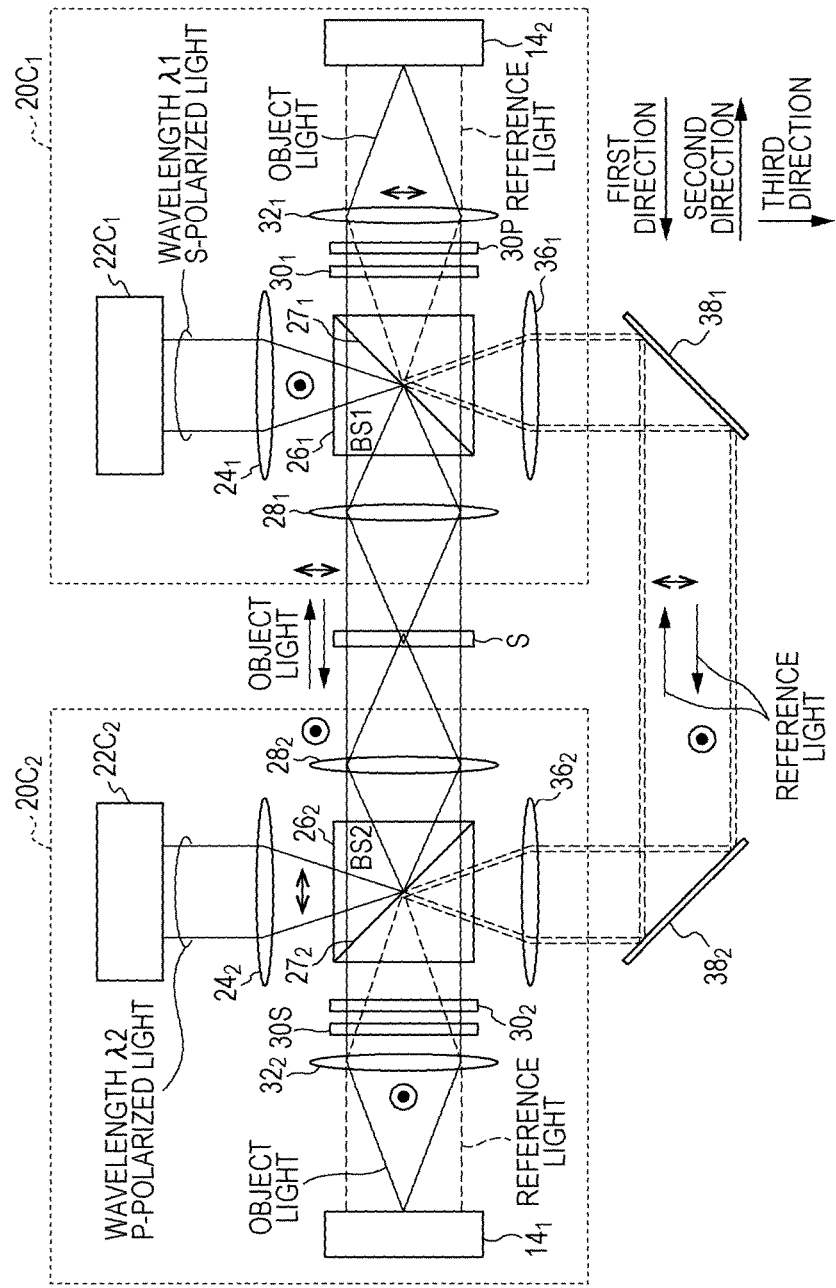
FIG. 22 is a schematic structural view of an exemplary structure of a hologram generating unit according to an eighth exemplary embodiment of the present invention.

FIG. 22 is a schematic structural view of an exemplary structure of a hologram generating unit 12 according to an eighth exemplary embodiment of the present invention. Except that a digital holographic apparatus according to the eighth exemplary embodiment includes the hologram generating unit 12 having a different structure in that object light is obtained by irradiating an observation object with light having different wavelengths and different polarization directions, the structure of the digital holographic apparatus according to the eighth exemplary embodiment is the same as the structure of the digital holographic apparatus according to the fifth exemplary embodiment. Therefore, corresponding structural features are given the same reference numerals, and are not described. Even in the eighth exemplary embodiment, as in the fifth exemplary embodiment, transmission light transmitted through the observation object is defined as object light. In addition, light with which the observation object is irradiated is a plane wave.

The hologram generating unit 12 according to the eighth exemplary embodiment includes a first unit $20C_1$, a second unit $20C_2$, and a pair of reflecting mirrors $38_1$ and $38_2$. Except that, in the first unit $20C_1$, a first light source $22C_1$ that projects "light having a first wavelength and being s-polarized light" is disposed in place of the first light source $22_1$ that projects light having the first wavelength, and a polarizing filter 30P that transmits only p-polarized light is inserted between a wavelength filter $30_1$ and a lens $32_1$, the first unit $20C_1$ has the same structural features as the first unit $20_1$ shown in FIG. 12. Therefore, the same structural features are not described.

Except that, in the second unit $20C_2$, a second light source $22C_2$ that projects "light having a second wavelength and being p-polarized light" is disposed in place of the second light source $22_2$ that projects light having the second wavelength, and a polarizing filter 30S that transmits only s-polarized light is inserted between a wavelength filter $30_2$ and a lens $32_2$, the second unit $20C_2$ has the same structural features as the second unit $20_2$ shown in FIG. 12. Therefore, the same structural features are not described.

In the eighth exemplary embodiment, the first unit $20C_1$ and the reflecting mirror $38_1$ and the second unit $20C_2$ and the reflecting mirror $38_2$ are symmetrically disposed with respect to a reference plane including the position of an observation object S. In the eighth exemplary embodiment, as in the fifth exemplary embodiment, the optical components are disposed along an optical axis of object light such that an optical axis of object light having the first wavelength is coaxial with an optical axis of object light having the second wavelength. Further, in the eighth exemplary embodiment, as in the fifth exemplary embodiment, the first unit $20C_1$ and the second unit $20C_2$ are disposed such that a focal position of a lens $28_2$ differs from a focal length of a lens $28_1$.

Operation of Hologram Generating Unit

Except that the "light having the first wavelength and being s-polarized light" is used in place of the light having the first wavelength, and the "light having the second wavelength and being p-polarized light" is used in place of the light having the second wavelength, the operation of the hologram generating unit according to the eighth exemplary embodiment is substantially the same as the operation of the hologram generating unit according to the fifth exemplary embodiment. Therefore, only differences are described.

Object light that has the first wavelength and is s-polarized light, and that exits from a second dividing optical element $26_2$ in a first direction is such that the wavelength filter $30_2$ removes light having wavelengths other than the first wavelength, and the polarizing filter 30S removes light other than the s-polarized light. Then, the lens $32_2$ gathers the light, and an image capturing surface of a first image capturing unit $14_1$ is irradiated with the gathered light.

Reference light that has the first wavelength and is s-polarized light and that exits from the second dividing optical element $26_2$ in the first direction is such that the wavelength filter $30_2$ removes light having wavelengths other than the first wavelength, and the polarizing filter 30S removes light other than the s-polarized light. Then, the lens $32_2$ collimates the light, and the image capturing surface of the first image capturing unit $14_1$ is irradiated with the collimated light.

The object light that has the first wavelength and is s-polarized light, and that illuminates the image capturing surface of the first image capturing unit 14, and the reference light that has the first wavelength and that is s-polarized light, and that illuminates the image capturing surface of the first image capturing unit $14_1$ interfere with each other to generate an interference fringe at the image capturing surface of the first image capturing unit $14_1$. The first image capturing unit $14_1$ captures, as a first hologram, the interference fringe generated at the image capturing surface.

Object light that has the second wavelength and is p-polarized light, and that exits from a first dividing optical element $26_1$ in a second direction is such that the wavelength filter $30_1$ removes light having wavelengths other than the second wavelength, and the polarizing filter 30P removes light other than the p-polarized light. Then, the lens $32_1$ gathers the light, and an image capturing surface of a second image capturing unit $14_2$ is irradiated with the gathered light.

Reference light that has the second wavelength and is p-polarized light and that exits from the first dividing optical element $26_1$ in the second direction is such that the wavelength filter $30_1$ removes light having wavelengths other than the second wavelength, and the polarizing filter 30S removes light other than the p-polarized light. Then, the lens $32_1$ collimates the light, and the image capturing surface of the second image capturing unit $14_2$ is irradiated with the collimated light.

The object light that has the second wavelength and is p-polarized light, and that illuminates the image capturing surface of the second image capturing unit $14_2$, and the reference light that has the second wavelength and that is p-polarized light, and that illuminates the image capturing surface of the second image capturing unit $14_2$ interfere with each other to generate an interference fringe at the image capturing surface of the second image capturing unit $14_2$. The second image capturing unit $14_2$ captures, as a second hologram, the interference fringe generated at the image capturing surface.

In the eighth exemplary embodiment, the optical axis of the object light having the first wavelength and being s-polarized light and the optical axis of the object light having the second wavelength and being p-polarized light are coaxial. By disposing the optical components symmetrically with respect to the reference plane including the position of the observation object, the optical components and optical paths are made common, so that the operation of the hologram generating unit 12 as a first hologram generating unit and the operation of the hologram generating unit 12 as a second hologram generating unit are performed at the same time. This enlarges a region including observation regions that are observed at the same time compared to the case in which the observation object is irradiated with light having a single wavelength and is observed.

Since the wavelength of the light having the first wavelength and the wavelength of the light having the second wavelength differ from each other, and the polarization direction of the s-polarized light and the polarization direction of the p-polarized light differ from each other, it is possible to irradiate the observation object with the light having the first wavelength and being s-polarized light and the light having the second wavelength and being p-polarized light to generate the "object light having the first wavelength and being s-polarized light" and the "object light having the second wavelength and being p-polarized light". The generated "object light having the first wavelength and being s-polarized light" and the generated "object light having the second wavelength and being p-polarized light" are separated by, for example, the wavelength filters and the polarizing filters. Therefore, by allowing the light to be transmitted through the polarizing filters in addition to through the wavelength filters, noise that is not capable of being completely removed by the wavelength filters is removed.

Ninth Exemplary Embodiment

Figure 23:
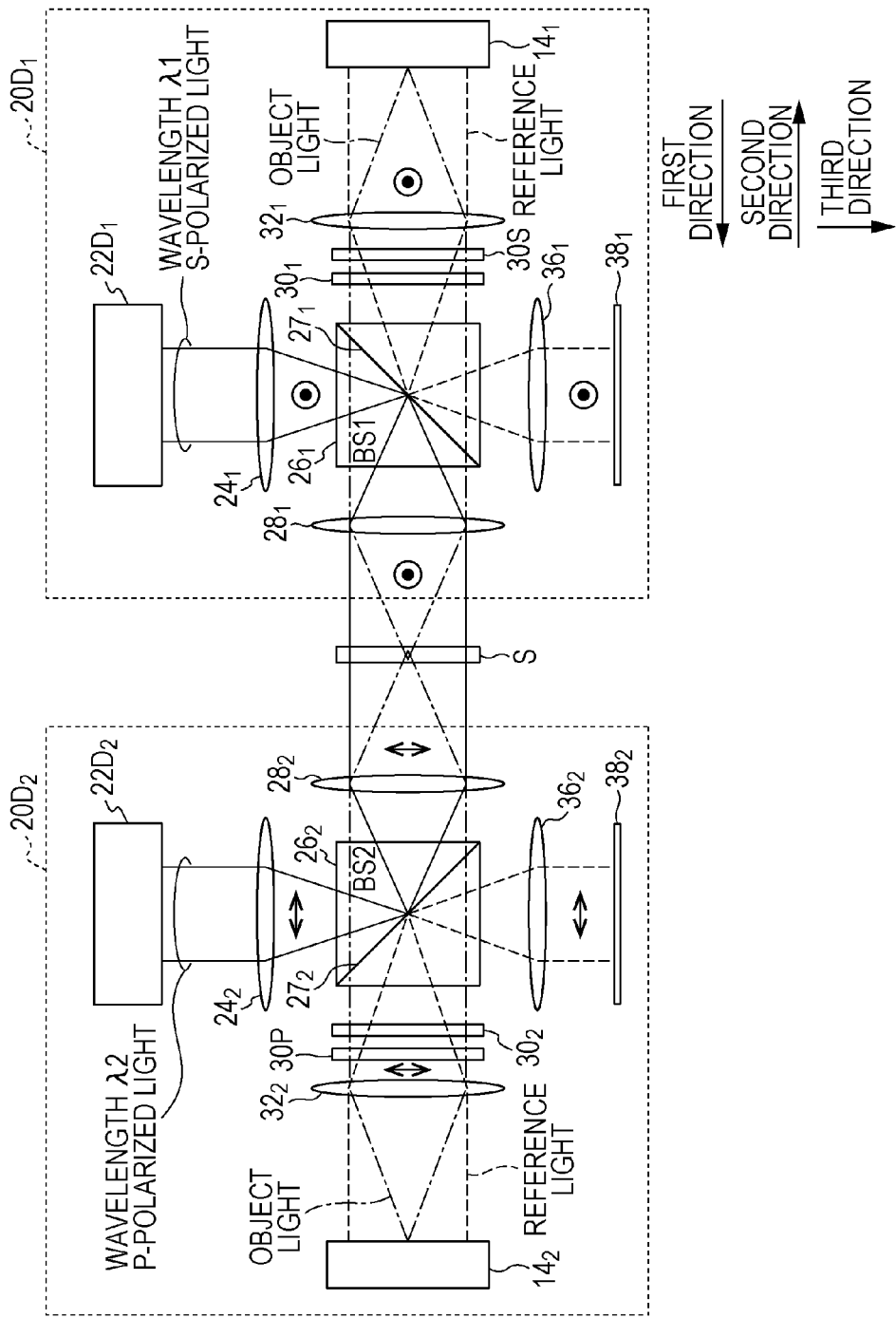
FIG. 23 is a schematic structural view of an exemplary structure of a hologram generating unit according to a ninth exemplary embodiment of the present invention.

FIG. 23 is a schematic structural view of an exemplary structure of a hologram generating unit 12 according to a ninth exemplary embodiment of the present invention. Except that a digital holographic apparatus (10) according to the ninth exemplary embodiment includes the hologram generating unit 12 having a different structure in that object light is obtained by irradiating an observation object with light having different wavelengths and different polarization directions, the structure of the digital holographic apparatus according to the ninth exemplary embodiment is the same as the structure of the digital holographic apparatus according to the seventh exemplary embodiment. Therefore, corresponding structural features are given the same reference numerals, and are not described. Even in the ninth exemplary embodiment, as in the seventh exemplary embodiment, reflection light reflected by the observation object is object light. Light with which the observation object is irradiated is a plane wave.

The hologram generating unit 12 according to the ninth exemplary embodiment includes a first unit $20D_1$ and a second unit $20D_2$. Except that, in the first unit $20D_1$, a first light source $22D_1$ that projects "light having a first wavelength and being s-polarized light" is disposed in place of the first light source $22_1$ that projects the light having the first wavelength, and a polarizing filter 30S that transmits only s-polarized light is inserted between a wavelength filter $30_1$ and a lens $32_1$, the first unit $20D_1$ has the same structure as the first unit $20B_1$ shown in FIG. 20. Therefore, corresponding structural features are not described.

Except that, in the second unit $20D_2$, a second light source $22D_2$ that projects "light having a second wavelength and being p-polarized light" is disposed in place of the second light source $22_2$ that projects the light having the second wavelength, and a polarizing filter 30P that transmits only p-polarized light is inserted between a wavelength filter $30_2$ and a lens $32_2$, the second unit $20D_2$ has the same structure as the second unit $20B_2$ shown in FIG. 20. Therefore, corresponding structural features are not described.

In the ninth exemplary embodiment, the first unit $20D_1$ and the second unit $20D_2$ are symmetrically disposed with respect to a reference plane including the position of an observation object S. In the ninth exemplary embodiment, as in the seventh exemplary embodiment, the optical components are disposed along an optical axis of object light such that an optical axis of object light having the first wavelength and being s-polarized light is coaxial with an optical axis of object light having the second wavelength and being p-polarized light. Further, in the ninth exemplary embodiment, as in the fifth exemplary embodiment, the first unit $20D_1$ and the second unit $20D_2$ are disposed such that a focal position of a lens $28_2$ differs from a focal length of a lens $28_1$.

Operation of Hologram Generating Unit

Except that the "light having the first wavelength and being s-polarized light" is used in place of the light having the first wavelength, and the "light having the second wavelength and being p-polarized light" is used in place of the light having the second wavelength, the operation of the hologram generating unit according to the ninth exemplary embodiment is substantially the same as the operation of the hologram generating unit according to the seventh exemplary embodiment. Therefore, only differences are described.

Object light that has the first wavelength and is s-polarized light, and that exits from a first dividing optical element $26_1$ in a second direction is such that the wavelength filter $30_1$ removes light having wavelengths other than the first wavelength, and the polarizing filter 30S removes light other than the s-polarized light. Then, the lens $32_1$ gathers the light, and an image capturing surface of a first image capturing unit $14_1$ is irradiated with the gathered light.

Reference light that has the first wavelength and is s-polarized light and that exits from the first dividing optical element $26_1$ in the second direction is such that the wavelength filter $30_1$ removes light having wavelengths other than the first wavelength, and the polarizing filter 30S removes light other than the s-polarized light. Then, the lens $32_1$ collimates the light, and the image capturing surface of the first image capturing unit $14_1$ is irradiated with the collimated light.

The object light that has the first wavelength and is s-polarized light, and that illuminates the image capturing surface of the first image capturing unit $14_1$ and the reference light that has the first wavelength and that is s-polarized light, and that illuminates the image capturing surface of the first image capturing unit $14_1$ interfere with each other to generate an interference fringe at the image capturing surface of the first image capturing unit $14_1$. The first image capturing unit $14_1$ captures, as a first hologram, the interference fringe generated at the image capturing surface.

Object light that has the second wavelength and is p-polarized light, and that exits from a second dividing optical element $26_2$ in a first direction is such that the wavelength filter $30_2$ removes light having wavelengths other than the second wavelength, and the polarizing filter 30P removes light other than the p-polarized light. Then, the lens $32_2$ gathers the light, and an image capturing surface of a second image capturing unit $14_2$ is irradiated with the gathered light.

Reference light that has the second wavelength and is p-polarized light and that exits from the second dividing optical element $26_2$ in the first direction is such that the wavelength filter $30_2$ removes light having wavelengths other than the second wavelength, and the polarizing filter 30S removes light other than the p-polarized light. Then, the lens $32_2$ collimates the light, and the image capturing surface of the second image capturing unit $14_2$ is irradiated with the collimated light.

The object light that has the second wavelength and is p-polarized light, and that illuminates the image capturing surface of the second image capturing unit $14_2$, and the reference light that has the second wavelength and that is p-polarized light, and that illuminates the image capturing surface of the second image capturing unit $14_2$ interfere with each other to generate an interference fringe at the image capturing surface of the second image capturing unit $14_2$. The second image capturing unit $14_2$ captures, as a second hologram, the interference fringe generated at the image capturing surface.

In the ninth exemplary embodiment, the optical axis of the object light having the first wavelength and being s-polarized light and the optical axis of the object light having the second wavelength and being p-polarized light are coaxial. By disposing the optical components symmetrically with respect to the reference plane including the position of the observation object, the operation of the hologram generating unit 12 as a first hologram generating unit and the operation of the hologram generating unit 12 as a second hologram generating unit are performed at the same time. This enlarges a region including observation regions that are observed at the same time compared to the case in which the observation object is irradiated with light having a single wavelength and is observed.

As in the eighth exemplary embodiment, it is possible to irradiate the observation object with two types of light beams having different wavelengths and polarization directions to generate two types of object light beams and separate the generated two types of light beams by, for example, the wavelength filters and the polarizing filters. Therefore, by allowing the light to be transmitted through the polarizing filters in addition to through the wavelength filters, noise that is not capable of being completely removed by the wavelength filters is removed.

Modifications and Application Examples

The structures of the digital holographic apparatuses according to the above-described exemplary embodiments are merely exemplifications. Accordingly, it goes without saying that these structures may be modified within a scope that does not depart from the gist of the present invention.

The digital holographic apparatus according to each of the above-described exemplary embodiments is also applicable to a digital holographic microscope. Even in the digital holographic microscope, as in an ordinary microscope, a region that is observed is reduced in size as the NA of objective lenses increases. When information about depth direction is important such as in measuring fluids, the region that is observed is limited in size.

For example, in measuring fluids, in order to observe the direction of flow, very small tracer particles are mixed with a fluid. As the diameters of the particles are reduced, an objective lens having a high NA is used for observing the positions of the particles. In this case, since an objective lens having a high NA is used, an area that is observed in a depth direction is reduced in size. As a result, it may not be possible to observe a desired region. In order to enlarge the region that is observed, the numbers of pixels of the image capturing units may be increased. However, this causes the image processing time to be increased.

According to the structures of the exemplary embodiments, it is possible to enlarge the region that is observed in a digital holographic microscope without increasing the number of pixels of the image capturing units.

Hitherto, reflection light generated by irradiating an observation object with light from one direction is recorded to measure the shape of the observation objection. However, in this method, in order to measure the surrounding of the observation object, the front and back sides of the observation object need to be reversed, which is troublesome.

According to the digital holographic apparatuses according to the exemplary embodiments, it is possible to observe an observation object from different observation directions, and to obtain at the same time a three-dimensional shape when a subject in the region that is observed is observed from one direction and a three-dimensional shape when the subject in the region that is observed is observed from a different direction.

Therefore, in the medical or biotechnological fields, it becomes easy to know the structure of an observation object whose structure is difficult to know because, for example, cells or microorganisms are very small. Even in other industrial fields, it becomes easy to know and examine the shape of very small structural bodies, such as toner particles, micro-electro mechanical systems (MEMS), or those in biomimetics.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A digital holographic apparatus comprising:
   a first hologram generating unit that generates a first hologram by causing first object light in a first observation direction to interfere with first reference light, the first object light being generated by irradiating an observation object in the first observation direction with light having a first wavelength, the first reference light being derived from the light having the first wavelength;
   a second hologram generating unit that generates a second hologram by causing second object light in a second observation direction that differs from the first observation direction to interfere with second reference light, the second object light being generated by irradiating the observation object in the second observation direction with light having a second wavelength, the second reference light being derived from the light having the second wavelength;
   a first image capturing unit that captures the first hologram at a first image capturing time, the first image capturing unit capturing the first hologram by receiving the first object light and the first reference light in parallel with each other; and a second image capturing unit that captures the second hologram at a second image capturing time, the second image capturing time partly or completely overlapping the first image capturing time, the second image capturing unit capturing the second hologram by receiving the second object light and the second reference light in alignment with each other.

2. The digital holographic apparatus according to claim 1, wherein a first capturing image captured by the first image capturing unit and a second capturing image captured by the second image capturing unit are associated with each other.

3. The digital holographic apparatus according to claim 1, wherein the first object light is transmission light corresponding to the light having the first wavelength and transmitted through the observation object, or reflection light corresponding to the light having the first wavelength and reflected by the observation object, and wherein the second object light is transmission light corresponding to the light having the second wavelength and transmitted through the observation object, or reflection light corresponding to the light having the second wavelength and reflected by the observation object.

4. The digital holographic apparatus according to claim 1, wherein a first observation region of the observation object based on the light having the first wavelength and a second observation region of the observation object based on the light having the second wavelength differ from each other.

5. The digital holographic apparatus according to claim 1, wherein a first observation region of the observation object based on the light having the first wavelength and a second observation region of the observation object based on the light having the second wavelength partly overlap each other.

6. The digital holographic apparatus according to claim 1, wherein an optical axis of the first object light and an optical axis of the second object light are coaxial, and wherein the second object light illuminates the observation object from a direction that is opposite to a direction from which the first object light illuminates the observation object.

7. The digital holographic apparatus according to claim 1, wherein the first hologram generating unit and the second hologram generating unit each include a light source, a dividing optical element that divides light from the light source into light that illuminates the observation object and the reference light, a reflecting section that reflects the reference light to a direction that allows the reference light to interfere with object light having a same wavelength, and a wavelength filter that transmits light having a same wavelength as the reference light.

8. The digital holographic apparatus according to claim 7, wherein the first image capturing unit, the wavelength filter of the second hologram generating unit, the dividing optical element of the second hologram generating unit, the dividing optical element of the first hologram generating unit, the wavelength filter of the first hologram generating unit, and the second image capturing unit are disposed in that order along a same straight line.

9. The digital holographic apparatus according to claim 1, wherein the light having the first wavelength is light polarized in a first polarization direction, the light having the second wavelength is light polarized in a second polarization direction differing from the first polarization direction, the first hologram generating unit includes a first polarizing filter that transmits only the light polarized in the first polarization direction and included in object light obtained by irradiating the observation object with the light having the first wavelength before the first object light and the first reference light interfere with each other, and the second hologram generating unit includes a second polarizing filter that transmits only the light polarized in the second polarization direction and included in object light obtained by irradiating the observation object with the light having the second wavelength before the second object light and the second reference light interfere with each other.

10. The digital holographic apparatus according to claim 1, further comprising an image processing unit that generates a first reconstructed image on a basis of the first hologram, and a second reconstructed image on a basis of the second hologram.

11. The digital holographic apparatus according to claim 1, wherein the first object light is generated by:

(i) a first light source emitting a light to a dividing optical element that divides the light into the first object light and the first reference light, the first object light passing through the dividing optical element, and (ii) the irradiating of the observation object, the first reference light being reflected by the dividing optical element away from the observation object, the first reference light being derived from the light having the first wavelength.

12. The digital holographic apparatus according to claim 1, wherein the second wavelength is different from the first wavelength.

* * * * *